April 25, 1939.   A. G. F. KUROWSKI   2,155,991
COMBINED TYPEWRITING AND COMPUTING MACHINE
Original Filed March 15, 1933   7 Sheets-Sheet 1

INVENTOR:
Alfred G. F. Kurowski
BY
ATTORNEY.

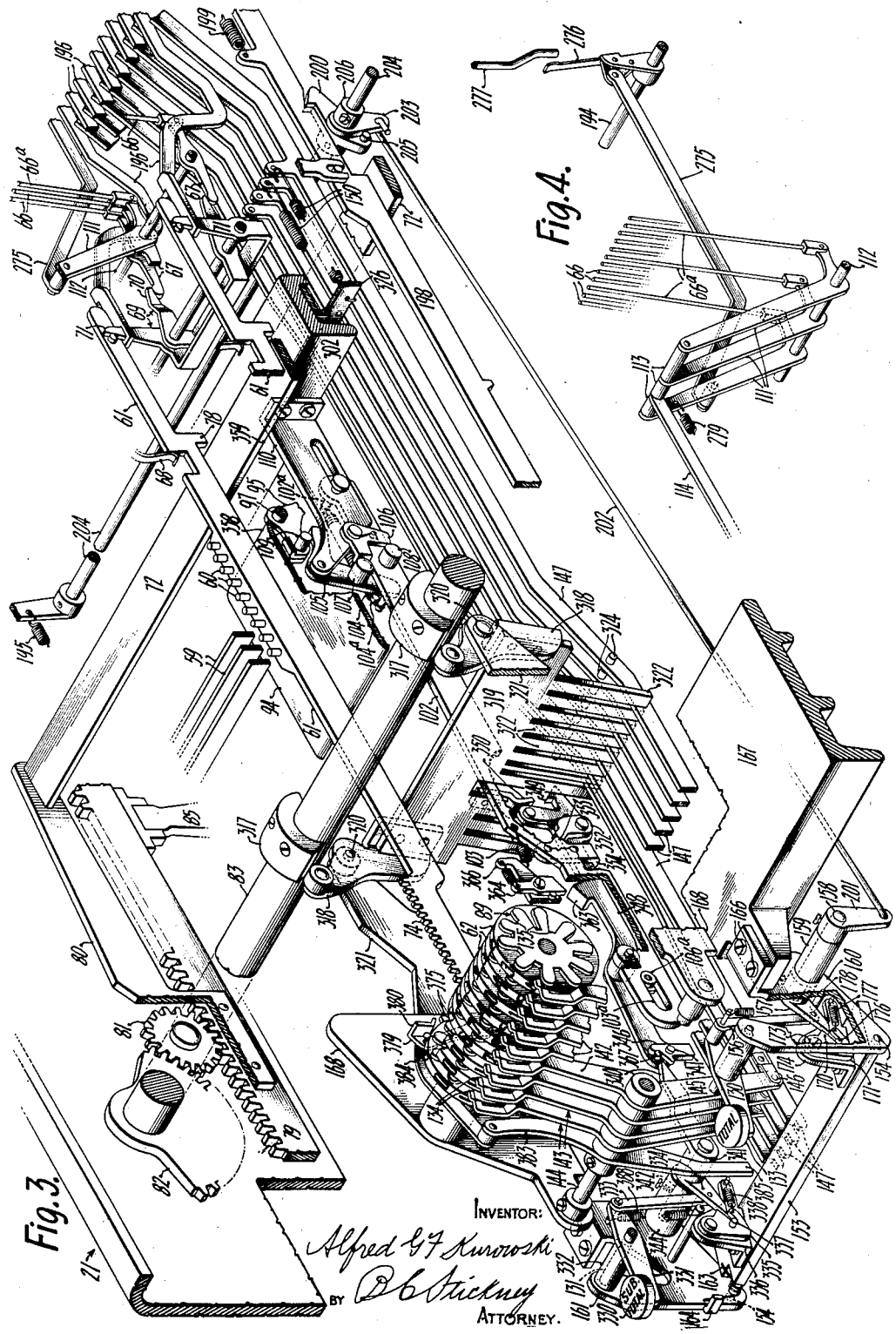

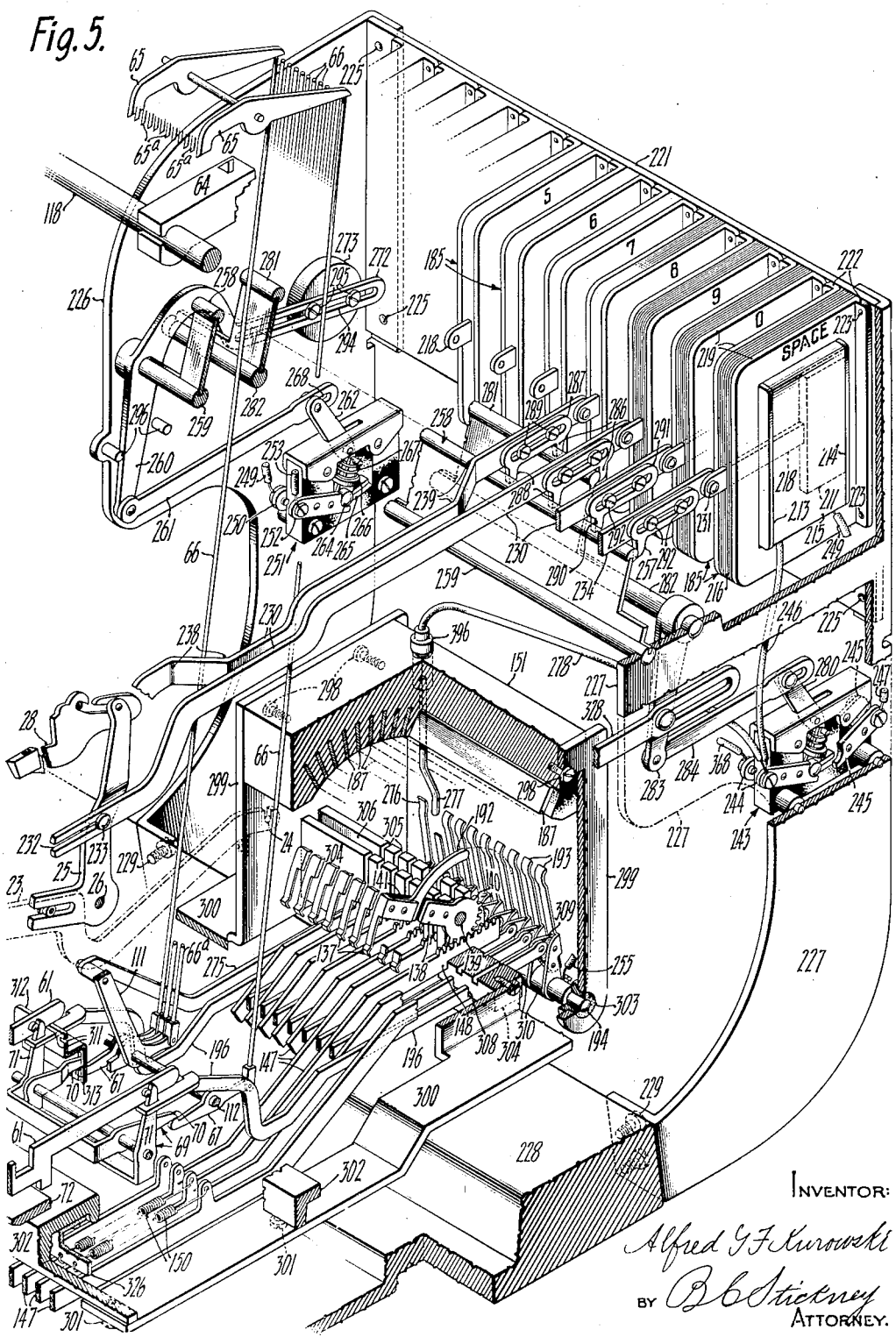

April 25, 1939.  A. G. F. KUROWSKI  2,155,991
COMBINED TYPEWRITING AND COMPUTING MACHINE
Original Filed March 15, 1933    7 Sheets-Sheet 4
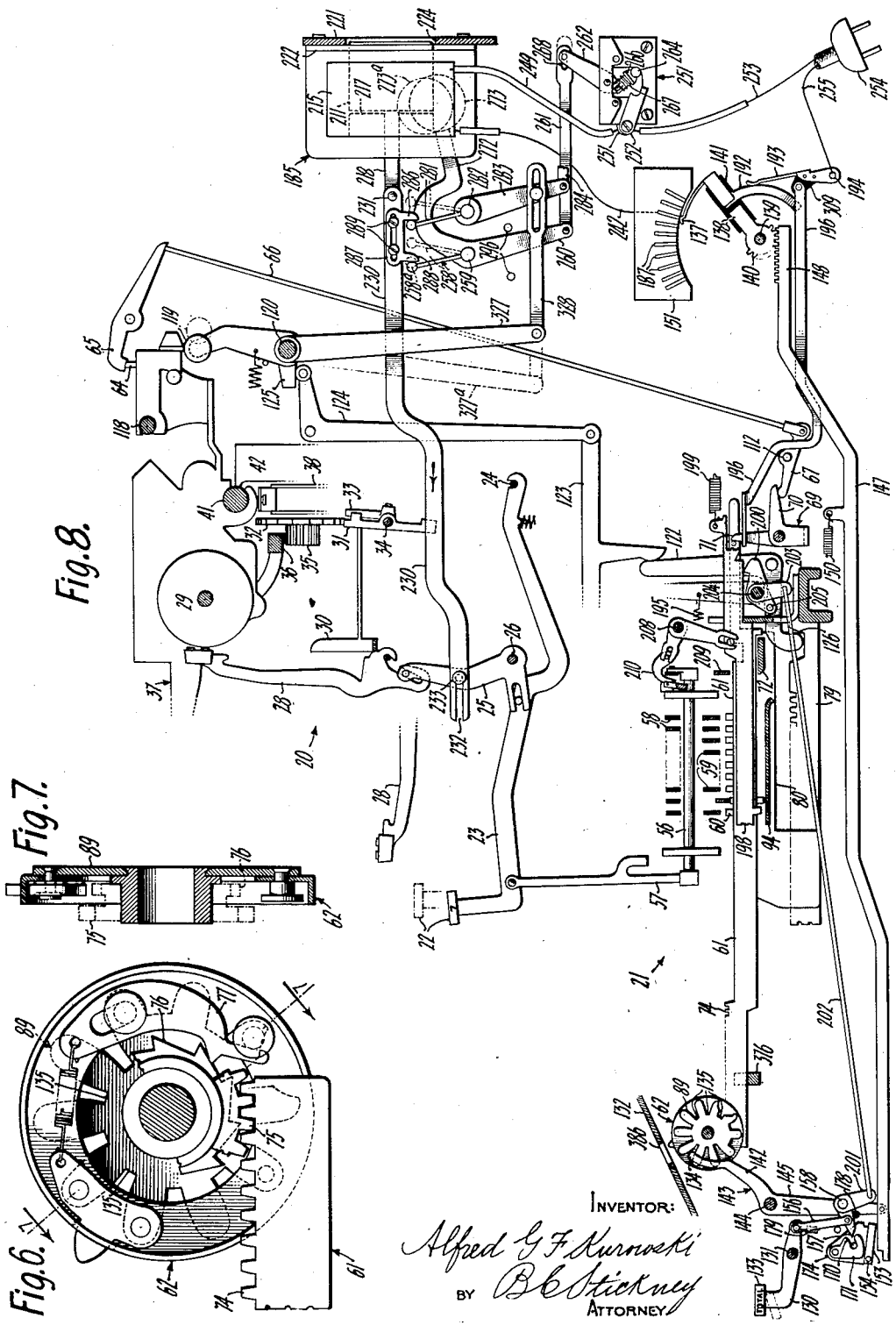
Inventor:
Alfred G F Kurowski
By B C Stickney
Attorney April 25, 1939. A. G. F. KUROWSKI 2,155,991
COMBINED TYPEWRITING AND COMPUTING MACHINE
Original Filed March 15, 1933 7 Sheets-Sheet 5
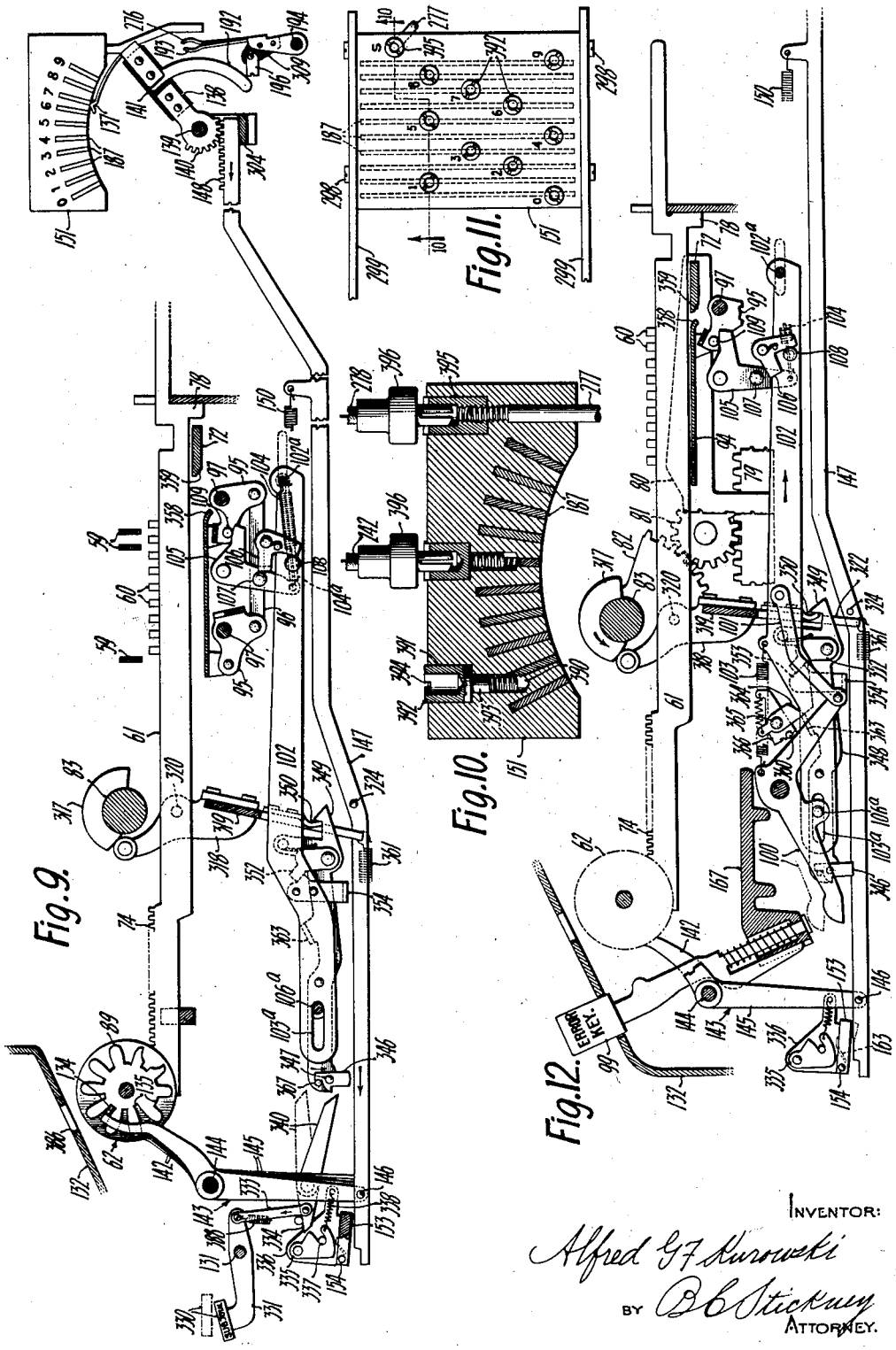
INVENTOR:
Alfred G F Kurowski
BY D C Stickney
ATTORNEY.

April 25, 1939. A. G. F. KUROWSKI 2,155,991
COMBINED TYPEWRITING AND COMPUTING MACHINE
Original Filed March 15, 1933 7 Sheets-Sheet 6
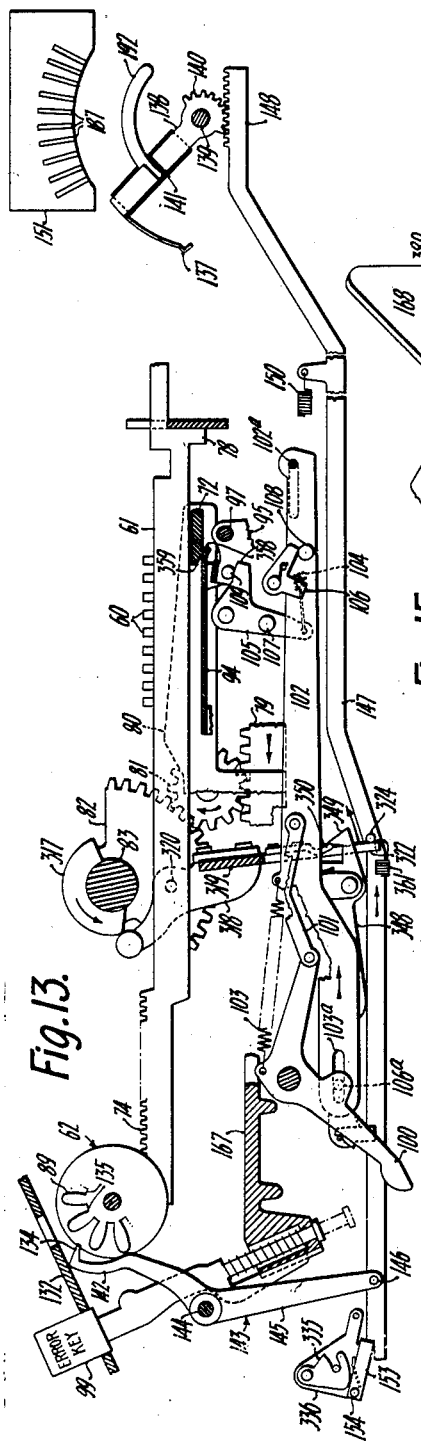
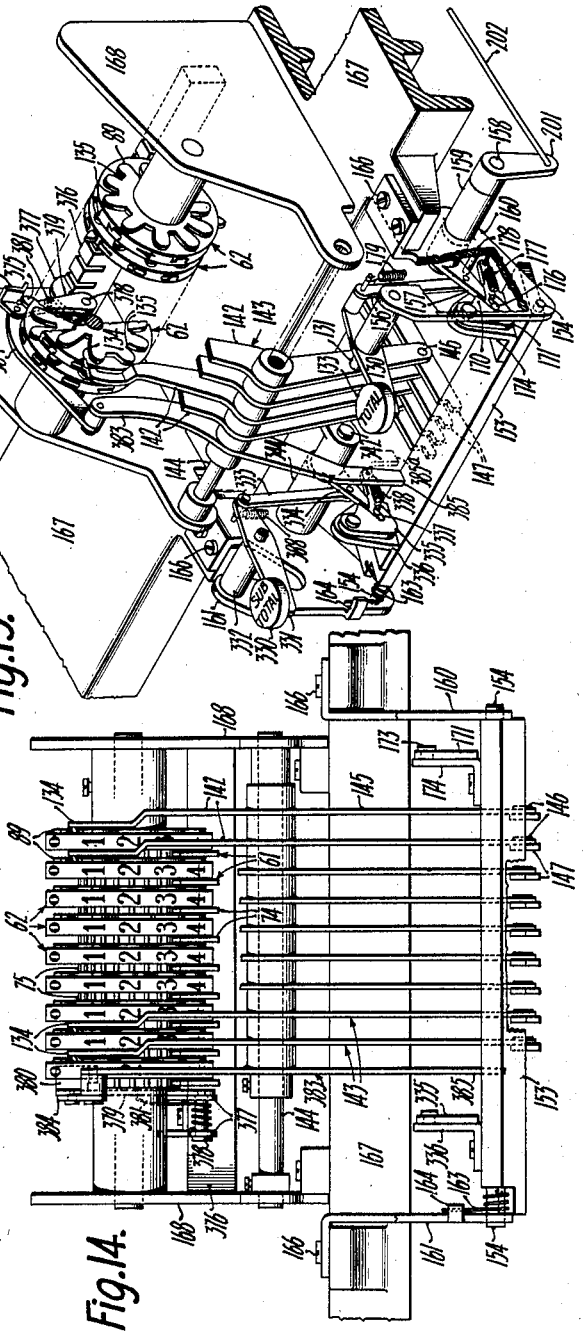
INVENTOR:
Alfred G F Kurowski
BY D E Stickney
ATTORNEY

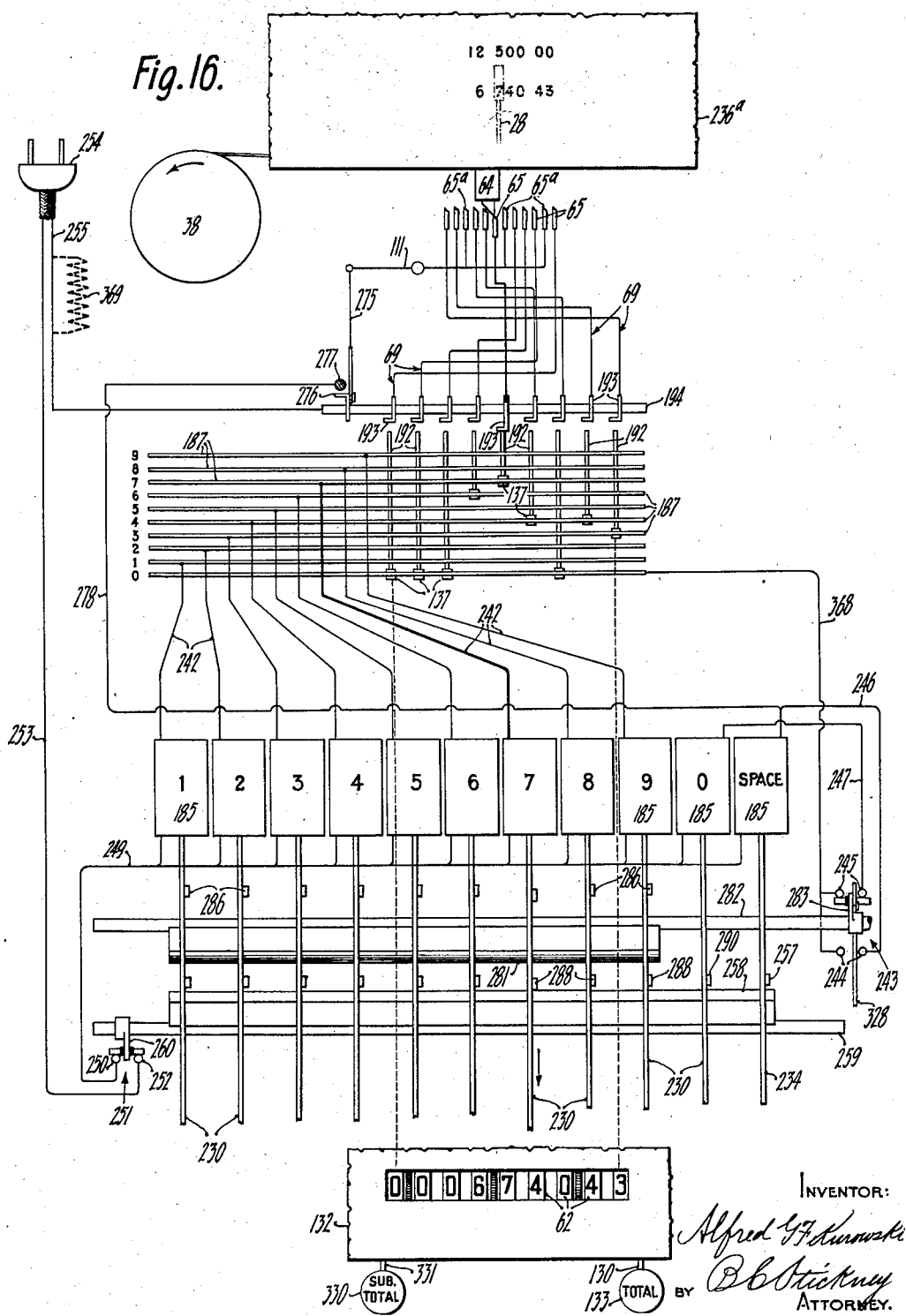

Patented Apr. 25, 1939

2,155,991

UNITED STATES PATENT OFFICE 2,155,991

COMBINED TYPEWRITING AND COMPUTING MACHINE

Alfred G. F. Kurowski, Brooklyn, N. Y., assignor to Underwood Elliott Fisher Company, New York, N. Y., a corporation of Delaware Continuation of application Serial No. 660,830, March 15, 1933. This application filed January 8, 1937, Serial No. 119,672

30 Claims. (Cl. 235—60)

This invention relates to combined typewriting and computing machines, and particularly to total-printing mechanism which may be called into use to automatically operate numeral-typebar trains to print in denominational succession the figures of a total as represented in a set of denominational register-wheels.

The present invention discloses improvements over the application of R. von Reppert, Serial No. 143,863, filed October 25, 1926 (now Patent No. 1,928,656, dated October 3, 1933).

In the Underwood bookkeeping machine, to which the invention is herein illustratively applied, the typing of an amount digit by digit on a work-sheet carried by the typing-machine carriage is accompanied by setting corresponding digit-pins in a denominational series of rack-bars, said carriage, in its letter-feeding steps through a computing zone, operating denomination-selecting trains to advance the rack-bars seriatim to pin-setting position. Each numeral-type key, when operated to print a digit in a computing zone, thus sets a digit-pin in the rack-bar corresponding to the denomination of the digit.

Following such typing and setting-up of an amount, the machine is cycled to advance the rack-bars and register-wheels driven thereby, to extents corresponding to the values of the set pins. Co-operating to advance the register-wheels are the usual carry-over devices.

The accumulated total has heretofore been printed by manual operation of the typewriting-mechanism numeral-type keys according to the figures displayed by the register-dial-wheels, and the agreement of the printed total with that displayed by said wheels depended on accurate copying by the operator. In such total-typing operation, corresponding digit-pins may be set preparatory to a subtractive operation which is for the purpose of clearing the dial-wheels during a machine cycle which may follow said typing operation, it being understood that in the course of total-typing, the carriage may actuate the aforesaid denomination-selecting trains associated with the rack-bars.

A machine of the above-described class is seen in Patent No. 1,280,065 to O. Minton.

For automatic total-printing, solenoids are preferably employed for actuating the numeral and space keys of the typewriting mechanism.

The present invention provides improved means whereby the register-dial-wheels control the selection of the printing solenoids according to the digits in the total. Improved means are also provided whereby the typewriting-machine carriage effects the operation of the selected solenoid at each denomination.

A simplified contact block having only one set of conductors, one conductor for each numeral-type-key solenoid from "0" to "9", is arranged to co-operate with a set of individually movable solenoid-selecting brushes, one brush for each dial wheel. It is contrived to dispose the contact block and brushes apart from the dial-wheels, so that sight reading of the figures on the latter is not obstructed. It is necessary to be able to read the dials for transcription of a negative total as will be explained. It is further contrived therefore that the solenoid-selecting position of each brush is controlled by means of a feeler normally latched in retracted position and arranged to co-operate with a graded stop carried preferably by the corresponding dial-wheel itself, the feeler and graded stop being arranged so as not to obstruct sight reading of the dial.

Upon operation of a total-key, the several latched feelers are released to drop upon their respective stops and thus move to extents depending, by reason of the grading of said stops, on the digit-representing positions of the dial-wheels. The several brushes, controlled by the feelers, will consequently make contact with such contact-block conductors as will indicate for operation the printing solenoids corresponding to the positions of the several dial-wheels.

Each brush may be provided, in addition to its brushing contact, with an extension, which, in any solenoid-selecting-brush position, is opposite a movable circuit-completing contact arm normally separated from said brush-extension.

The indication or selection, by means of said contact block and co-operating brushes, of the printing solenoids does not of itself energize the solenoids, since it is desired that the latter be operated one by one, in proper denominational order, as determined by the letter-feed or denomination-determining movements of the typewriting-machine carriage during automatic total-printing. The several circuit-completing contact arms, there being one for each solenoid-selecting brush, are actuated seriatim by means of the aforesaid carriage-controlled denomination-selecting trains to make contact with the extensions of their respective brushes, and thereby complete, in denominational order, individual circuits for the selected solenoids so as to energize the latter one by one.

Improved means are also provided whereby each energized solenoid, after driving its typebar train to print, is operative to disable the energizing circuit by means of a switch common to all the solenoids. This de-energizes the solenoid and permits the type-bar to rebound normally from the platen, and also permits self-restoration of the parts whereby the solenoid actuates said type-bar train.

An operating train for the disabling switch is common to all the solenoids and includes a flyweight device. Said device has the function of storing energy at the beginning of a solenoid stroke so that said energy becomes available to assist the solenoid in completing the throw of the switch. The fly-weight device has an oscillatory movement and is thus effective to throw the switch back again to restore the circuit for operating a solenoid at the next denomination. The fly-weight device being oscillatory, provision is made for regulating it so that its vibration period harmonizes with the desired speed of typewriting machine operation. It is thus assured that the circuit will be disabled and restored in correlation to the desired speed of succession of printing strokes and accompanying carriage-feed movements.

Following the operation of the total-key and the resulting selection of the printing solenoids as above described, the typing-machine carriage is in every case tabulated to the highest denominational position in the computing or total-printing zone. The total to be printed, however, may have a less number of denominational places than the denominational capacity of the set of dial-wheels, and, in such case, the full set of dial-wheels will indicate one or more zeros ahead of the first significant figure of the total. The printing of these latter zeros is not desired. Improved means are provided for operating a solenoid for the usual typewriting-machine space-key, instead of the zero-key solenoid. This space-key operation takes place at each dial-wheel which represents a zero ahead of said first significant figure, and consequently the carriage is automatically spaced from the highest denomination-position to the position where the printing of the total begins.

The operating solenoid for the usual space-key of the typewriting machine and the printing solenoid for the zero-type train are therefore controlled, so that when the carriage is tabulated to the aforesaid highest denomination in the zone and the dial-wheel at that denomination is at the zero-position, the space-key solenoid, instead of the zero-printing solenoid, will be energized. That is to say, the space-key solenoid is energized by way of the aforesaid brush (in zero-position), by way of the aforesaid circuit-completing contact arm, which has been brought against the brush at the arrival of the carriage at said highest denomination, and furthermore, by way of a current-path afforded by a two-way switch, which, before the total-key is operated, will have been thrown to cut out the zero-printing solenoid and cut in the space-key solenoid. The space-key solenoid is operative by means of the aforesaid circuit-disabling switch to de-energize itself after operating the carriage-feed mechanism to step the carriage to the next lower denomination.

Should the dial-wheel at said next lower denomination stand at zero, the space-solenoid will again be energized and the carriage stepped to the next lower denomination. Operation of the space-key will thus be repeated until the carriage reaches the position of the first significant figure of the total as represented in the dial-wheels.

Since the space-key solenoid is at this stage operable by way of a brush at the zero-position, it will be seen that when the carriage arrives at the first significant figure-denomination, the contact brush for that denomination will not be at zero-position, but will be at the position corresponding to said first significant figure. Consequently the solenoid corresponding to the first significant figure, and not the space-solenoid, will be energized by way of the circuit-completing contact arm at that denomination.

Improved means are provided whereby any significant figure-solenoid is operative to throw the aforesaid two-way switch to cut out further operation of the space-key solenoid by way of a contact brush at the zero-position, and instead cut in the zero-printing solenoid. Thus all zeros appearing after the first significant figure in the total will be printed.

At the cycling operation following the automatic operation of the type-keys, the two-way switch is automatically restored to cut in the space-key solenoid again, so that the latter becomes operative, if necessary, to step the carriage to the first significant figure-denomination without printing zeros at the beginning of automatic printing of the next total.

Improved means, independent of the two-way switch and dial-wheel control, are provided for operating the space-key solenoid for punctuation-spaces in the printed total. At a desired punctuation-space, the usual denomination-selector on the carriage may operate a punctuation-space jack. In case more than one punctuation-space is provided for, the several space-jacks may be operative upon a common member. For completing the circuit to the space-key solenoid, a circuit-completing contact arm may be operated by said member to engage an extension of one of the space-solenoid terminals incorporated as a projection in the aforesaid contact block. The space-solenoid circuit completing contact arm may be additional to the aforesaid set of circuit-completing arms provided for the other solenoids.

An important feature of improvement resides in arranging many of the parts of the total-printing mechanism in a unitary assembly group, which may be disposed outside of the computing and typewriting mechanisms, and thus minimize complication of the latter. Said unitary assembly group is preferably disposed behind the machine and may include the solenoids, the contact block and co-operating solenoid-selecting brushes, and the set of carriage-controlled circuit-completing contact arms. Said assembly group may also include the circuit-disabling switch, the switch for alternatively throwing in the space-solenoid or zero-solenoid and the operating trains for said switches. Said assembly may thus include all current-carrying parts, thus facilitating the insulation of said parts. Furthermore the arrangement of the parts in such unitary assembly conduces to economy in manufacture and maintenance, the parts being readily accessible for inspection, adjustment and repair.

The solenoids may be disposed so that simple links serve to connect the several solenoid-plungers to corresponding type-actions.

The aforesaid feeler-controlled contact-block brushes are arranged at the free ends of individually swingable arms mounted on a common fulcrum-shaft. Each brush-carrying arm presents as the aforesaid extension an arcuate contact surface concentric with the arm-axis. The carriage-controlled circuit-completing contact arms and the arcuate contact surfaces are arranged so that contact may be made between any contact surface and its corresponding carriage-controlled arm when the brush is in solenoid-selecting position.

In the herein-illustrated machine, the totalizer-dial-wheels are at the front together with the aforesaid feelers engaging the described graded stops on said wheels. Each feeler may be at the end of one arm of a pivoted lever, and, from the end of another arm of said lever, there may extend, a link, connecting the feeler-lever to its corresponding contact-brush arm in the unitary assembly group. These links may be arranged to extend under the computing mechanism, so as to be generally clear thereof, and may be provided at their rear ends with racks meshing with pinion-sectors on the contact-brush arms.

The contact-brush arms and the feeler-levers are normally in retracted positions. They may be held in such positions against the pull of individual springs which urge the trains, each comprising a feeler-lever, link and contact-brush arm, to operative positions. For releasably holding the feeler-trains, a latch, common to all the trains, is employed. A total-key at the front of the machine is operative to withdraw said latch when it is desired to print a total, the several feelers and contact brushes thereupon assuming positions corresponding to the positions of the dial-wheels, as above described.

Operation of the total-key also releases a subtraction-setting member. Subtraction is effected by the complementary method, in which operation of any numeral-type key sets a pin in the aforesaid dial-wheel rack-bar, whose value is the subtractive complement of the value of the numeral-key. Said member, released by operation of the total-key, conditions the pin-setting mechanism, so that such complementary setting of the pins is effected during the printing of the total and the total-wheels will be cleared in the following machine cycle. The subtraction-setting mechanism may be as set forth in the aforesaid Minton patent.

The set pins are engaged to advance the rack-bars and dial-wheels during the forward stroke of a reciprocatory general operator of the cycling mechanism, and are restored by said general operator which actuates the usual pin-restoring mechanism during its return stroke.

Since the dial-wheels are rotated during a machine cycle, following automatic total-printing, means are provided to first withdraw and relatch the described feelers from their solenoid-selecting positions on the dials at the start of the cycle. In the described machine, the forward stroke of the general operator has at the beginning an idle period before any pin-bar is picked up. The general operator may thus, during said idle period, actuate mechanism for withdrawing the feeler-trains, the aforesaid latch being arranged to relatch the feeler-trains upon said withdrawal.

A further feature of the invention relates to automatic printing of sub-totals which are distinguished from the other totals, in that there is no clearing of the dial-wheels.

A sub-total-key mechanism is arranged to withdraw the aforesaid feeler-train latch, permitting the feelers to drop upon the graded stops of the dial-wheels for selection of the solenoids as above described. The carriage is, following operation of the sub-total key, tabulated to the highest denomination in the total-printing zone, whereupon the printing of the sub-total automatically ensues by means of the selected solenoids energized one by one as described.

The sub-total-key mechanism includes means whereby its operation connects the pin-restoring mechanism to the general operator in such a way that the rack-bar pins, which may be set incidentally to the sub-total-printing operation of the numeral-key trains, are restored in the described idle period at the start of the general-operator cycle. The pins being thus restored, the general operator is unable to advance the dial-wheel rack-bars, and consequently the dial-wheels will not be rotated, that is, they will not be cleared, but will remain in the positions corresponding to the sub-total.

A further feature of the invention relates to the condition wherein the dial-wheels in some computations register a negative or minus total. In subtracting by the complementary method, in debiting an account, a minus total, the result of over-subtraction (overdraft), is represented in the dial-wheels by the complement of said minus total. A characteristic of such complementary total is that those dial-wheels to the left of the first significant figure of the complementary total, register nines instead of zeros. That is to say, in the dial-wheel set of usual denominational capacity, the one of highest denomination will display a nine if the minus total has at least one less denomination-place than the denominational capacity of the set of dial-wheels. This condition is taken advantage of to lock the total and sub-total keys against operation, in order to prevent automatic printing of the minus total in the complementary form displayed by the dial-wheels. To this end, the dial-wheel of highest denomination is provided with a tooth, which, in the nine-position of said highest wheel, is effective to lock the total-keys. Thus the operator, upon attempting to operate either total-key and finding it locked, will be apprised that the dial-wheels probably indicate a minus total. It will be evident that in cases of doubt, as to whether the total-keys are locked by reason of a minus total, or because the highest denomination-wheel stands at nine for a positive total, a brief consideration of the account will be determining.

The true number representing the minus total is the complement of that displayed by the dial-wheels, and the operator may copy, by manual operation of the numeral-type keys, the complements of the significant figures displayed by the dial-wheels. It is thus an advantage that visibility of the dial-wheels is provided for as hereinbefore mentioned. In transcribing the true minus total from its complement as displayed by the dial-wheels, the pins in the rack-bars are to be set for addition, so that in the following cycling operation, the wheels can be reset to zero.

This application is a continuation of, or substitute for, my application Serial No. 660,830, filed March 15, 1933.

Other features and advantages will hereinafter appear.

In the accompanying drawings:

Figure 3 is a perspective view of part of the computing mechanism showing the set of dial-wheels, pin-bar mechanism, cycling mechanism, and subtraction-setting member, and also showing the related parts of the total-printing mechanism.

Figure 4 is a perspective view of part of the carriage-controlled train operative to actuate the circuit-completing arm for energizing the space-key solenoid for a punctuation-space.

Figure 5 is an enlarged perspective view of the aforesaid unitary assembly disposed behind the machine, and shows the operating connections extending from said assembly.

Figures 6 and 7 are side and front views respectively of one of the totalizer-dial wheels and its graded feeler-stop.

Figure 8 is a skeleton diagram of the machine, showing one of the solenoids as having driven its numeral-type train to print. The positions, under this condition, of the controlling and co-operating parts are also shown.

Figure 9 is a side view illustrating how pin-restoring mechanism is conditioned, by operation of the sub-total key, for operation which is to take place at the start of the machine cycle.

Figure 10 is an enlarged cross-section view through the contact block, showing details of structure.

Figure 11 is a top plan view of the contact block, showing the arrangement of sockets for leads to the conductors.

Figure 12 is a view similar to Figure 9, showing the pin-restoring mechanism operated to restore the pins at the start of the machine cycle.

Figure 13 is a view illustrating how the feelers and contact brushes are retracted and relatched at the start of the machine cycle which follows the printing of a sub-total, it being noted that such retraction is carried out in the same way following any automatic total-printing.

Figure 14 is a front view of the set of dial-wheels and co-operating feeler-levers and latch-bar for the latter, and shows particularly how the highest denominational dial-wheel is operative to prevent release of said latch and hence lock the total-keys when the dials exhibit a minus total.

Figure 15 is a perspective view of the dials, feeler-levers and latch-bar showing the latch-locking train in its operated position, wherein it is effective to prevent operation of either of the illustrated total-keys.

Figure 16 is a diagram representing the circuit-arrangement whereby the solenoids, contact-block conductors, brushes, and circuit-completing carriage-controlled contact arms co-operate. The mechanical elements controlling the circuits are also represented in said diagram.

Figures 1, 2:
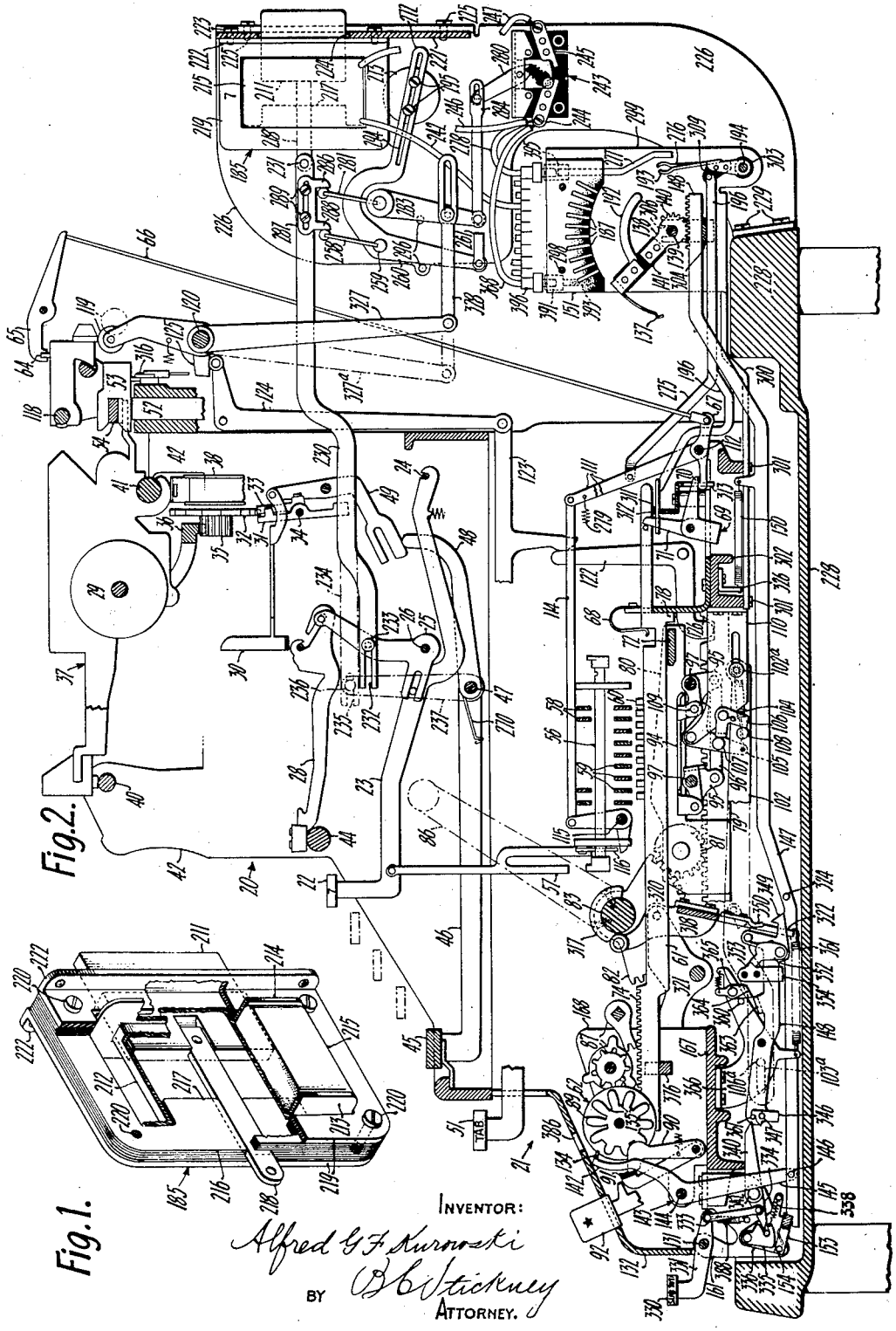
Figure 1 is a perspective view showing details of solenoid-structure.
Figure 2 is a side sectional view of the Underwood bookkeeping machine, showing the application of the novel total-printing mechanism thereto.

A typewriting machine 20 surmounts a computing base 21 and has the usual row of numeral-keys 22, on key-levers 23, fulcrumed at 24. Manual operation of any key-lever 23 swings a bell-crank 25, fulcrumed at 26, to drive a numeral-type bar 28 toward a platen 29. Each type-bar 28 as it reaches the platen drives the usual universal bar 30 rearwardly to interpose a fixed dog 31 into the plane of an escapement-wheel 32 and concomitantly release a stepping dog 3, which, upon rebound of the type-bar 28, returns to the plane of the escapement-wheel 32, which has a pinion 35 meshing with a rack 36, on a traveling carriage 37, supporting the platen 29. Oscillation of the dogs 31 and 33 about dog 33, which, upon rebound of the type-bar 28, letter-feeds the carriage 37 pulled by the usual spring-motor 38. Said carriage travels upon front and rear rails 40, 41, on typewriter-frame 42. The several type-bars 28 normally bear against a rest 44.

A space-key 45 is mounted upon arms 46, fastened to rock-shaft 47, operative, upon pressing said space-key, to swing arm 48, and thereby rock a member 49 connected as seen in Figure 2 to actuate the universal bar 30, and operate the dogs 31 and 33 for a letter-feeding step or space.

The usual tabulating-key lever 51, partly shown, is operative to release the carriage and concomitantly elevate the partly-shown tabulating stop 52 into the path of a counter-stop 53, settable along a rack 54, carried by the typewriter-carriage 37.

Each numeral-key lever 23, when operated, rocks a corresponding shaft 56 by means of a pendant 57. There is one of said shafts for each numeral-key lever 23, from one to nine, and, as described in the aforesaid Minton patent, each shaft when rocked is operative by means of an upper link 58 and other connections, not shown, to depress edgewise a bar 59. Each bar 59 when depressed may set a corresponding digit-pin 60 which is one of a row presented by a pin-bar 61 operative to drive a register-dial-wheel 62. The zero numeral-key lever does not set a digit-pin in the illustrated machine.

As seen in Figure 2, the pin-bars 61 are normally in such position that their pins 60 are somewhat behind and thus out of the path of the pin-setting bars 59. The pin-bars are advanced seriatim to pin-setting position in denominational order corresponding to the letter-feed or denomination-determining advance of the typewriting-machine carriage through a computing zone. The carriage 37 therefore has the usual tappet 64 arranged to engage seriatim a set of pivoted jacks 65, and thereby depress the usual thrust-rods 66 to operate levers 67, Figure 2. A set of transposing levers 69, similar to those seen in the Kupetz Patent No. 1,697,981 is interposed between the set of levers 67 and the pin-bars 61, each transposing lever having one arm 70 engaged by a lever 67, and another arm 71 offset or transposed, as seen in Figure 3, to move the pin-bar 61 of the same denomination as said latter lever to pin-setting position. For each pin-bar there is the usual spring 68 for retracting the pin-bar from its pin-setting position.

Operation of the numeral-key levers 23 in a computing zone results, by the described usual means, in the setting of corresponding digit-pins in the set of pin-bars 61 preparatory to a cycling operation during which said pin-bars 61 are advanced by means of the set pins to rotate the dial-wheels 62. In said cycling operation, the usual cross-bar 72 makes a forward and return movement. By means of the depressed pins 60, the pin-bars 61 are picked up and advanced by the forward movement of said bar.

Each pin-bar has at its forward end the usual rack 74 meshing with a pinion 75, Figure 6, which, by means of the usual ratchet 76 and pawl 77, has a one-way connection to the dial-wheel 62, so that only the forward movement of the pin-bar 61 may rotate said dial-wheel. The cross-bar 72 in its return movement thus picks up and returns the pin-bars 61, by means of shoulders 78 on the latter, without rotating the dial-wheels. The cross-bar 72 is advanced and returned by means of the usual general operator which includes side racks 79 having arms 80, between which the cross-bar 72 is supported. Each rack 79 is connected by a pinion 81 to a sector 82, the two sectors 82 being each fastened to a cross-shaft 83, journaled in the side members of the framework in which said racks 79 are guided. The usual power-driven reciprocatory arm 85 drives the general operator forward and back for a cycle. The power-drive is set forth in Thornton Patent No. 1,283,360. Said general operator may also be operated manually by a handle 86 connected to the cross-shaft 83.

The usual carry-over devices 87 of the kind shown in said Thornton patent are called into use during the return stroke of the general-operator train to advance the dial-wheels 62 an extra carrying step as may be determined by the forward movement of said wheels by the pin-bars 61.

Each dial-wheel has fastened to its side a detent-disk 89 having its edges notched as seen in Figure 2 for cooperation with individual spring-pressed detent-arms 90. The detent-notch corresponding to the zero-position of each dial-wheel is somewhat deeper than the notches corresponding to the other dial-wheel positions. A spring-pressed bar 91 presses against the detent-arms 90 as seen in Figure 2, and it will be seen that by the two possible positions of any detent-arm 90, said bar 91 will be in one position when all the dial-wheels stand at zero, and in another position when one or more dial-wheels are displaced from the zero-position. In the all zero or clear position, the bar 91 clears the usual star-key 92 to permit its operation for printing the usual clear signal by means not shown but described in Hoyt Patent No. 1,256,309. The position of any dial-wheel 62 at any other than zero will block, by means of the bar 91, operation of the star-key 92.

As the general operator nears the end of its return movement, a pin-restoring plate 94 is raised by means of the usual linkage, which includes bell-cranks 95, links 96 and cross-shafts 97, one of the cross-shafts being operative by the general operator near the end of the return stroke of the latter and carrying an arm not shown, to engage the under side, and thereby raise the pin-restoring plate 94.

The usual error-key train shown in Vickers Patent No. 1,455,280 is operative to restore the pins 60 manually. Said train includes an error-key 99 operative to swing a lever 100, and thereby, through a link 101, move a slidably-mounted bar 102 rearwardly against the tension of a restoring spring 103. The rearward movement of said bar may stretch a spring 104, attached to a lever 105, restrained by a spring-pressed latch 106, which abuts a pin 107 of said lever 105. Within the spring 104 is a rod 104a, which together with said spring 104 forms a flexible coupling between the lever 105 and error-key bar 102. The ends of said rod 104a normally abut the lever 105 and a stud 102a of said bar 102, to which one end of said spring 104 is attached, see Figure 9. Said error-key bar 102 carries a pin 108 to displace said latch 106 as said bar 102 moves rearwardly to tension the spring 104, so that the lever 105 thus released to the tension of said spring 104 may start its swing with a snap to raise the restoring plate and restore whatever pins were set. Said lever 105 engages a pin 109 on one of the restoring plate bell-cranks 95, these bell-cranks being loose on their cross-shafts 97.

Upon release of the error-key 99, the parts are restored to their normal positions as seen in Figure 9.

The lever 105 and latch 106 are pivoted upon bracket 110, Figure 2, which also slidably supports the rear end of the bar 102. The forward end of said bar 102 has a slot 103a whereby it is slidably guided upon a pin 106a, Figure 12, of the error-key lever 100.

The usual key-locking device, operative to prevent depression of more than one numeral-key lever at a time, is also operative to lock the keys when the typewriting-machine carriage 37 is at a punctuation-space in a computing zone. Said mechanism is fully set forth in Gumprecht Patent No. 1,237,895 and includes, for each punctuation-space, a jack 65a, additional to the set of denomination-jacks 65, and a thrust-rod 66a. In the illustrated machine, there is provision for three punctuation-spaces, and, as seen in Figure 4, there are three thrust-rods 66a. Each thrust-rod 66a is connected to a lever 111 mounted on a fulcrum-rod 112 with the levers 67 actuated by the set of denomination-thrust-rods 66. The three levers 111, actuating the same mechanism, are joined by connections 113. From the thus joined levers 111, there extends a link 114 to operate the usual shaft 115, which, when rocked, closes the usual set of tumblers 116 to lock the numeral-key levers 23.

The denomination-selecting tappet 64 is mounted as seen in Figure 2 to swing about rod 118 of the carriage, so that it may be disabled by being dropped out of the path of the jacks 65. When the carriage is in a computing zone, the tappet is upheld by means of the usual roll 119, mounted upon a rock-shaft 120 to swing rightward from the position seen in Figure 2.

The tappet-supporting roll 119 is swung to ineffective position immediately at the start of the forward movement of the general operator. One of the racks 79 of the latter displaces the usual lever 122, which, by means of link 123, bell-crank lever 124 and arm 125, fastened to rock-shaft 120, causes the latter to be rocked and the tappets 64 to be dropped at the beginning of the machine cycle. For displacing said lever 122, said rack 79 has a cam-notch 126, in which a nose of said lever normally rests as seen in Figure 2, and into which the nose drops again at the end of the cycle for restoring the roll 119 to normal position.

The novel automatic total-printing mechanism will now be described.

At the front of the machine, a lever 130 is freely fulcrumed upon a rod 131 and projects outside of a casing 132 of the computing base to carry a total-key 133. Depression of said total-key 133 rocks said lever 130 for releasing a set of normally retracted feelers 134 to drop upon graded stops 135 presented by the dial-wheel detent-disks 89. The particular stop 135, engaged by each feeler, being at a graded distance from the retracted position of the feeler, represents the digit-position of the dial-wheel.

Each feeler 134 at the front of the machine, in dropping to its stop-position, moves a contact brush 137, which is located behind the machine. Each contact brush 137, which may be formed as seen in Figure 5, is mounted upon an arm 138, fulcrumed upon a rod 139, the arm 138 being provided with a pinion-sector 140, and being insulated from the brush by an insulator 141.

The several feelers 134 are at the ends of upstanding arms 142 of levers 143, pivoted upon a common fulcrum-rod 144, and having each a downwardly-extending arm 145, pivotally connected at 146 to a link 147 extending rearwardly along the bottom of the machine, as seen in Figure 2, and having at its rear end a rack 148 which meshes with the contact-arm pinion-sector 140. Each link is urged forwardly by an individual spring 150, but is normally held in the Figure 2 position, wherein the contact brushes 137 are retracted from a contact block 151, by a latch-bar 153. Said latch-bar 153 is common to all the feeler-trains and is pivoted at 154 to swing its latching edge upwardly for releasing said trains to move individually to the positions determined by the feelers 134 and co-operating stops 135. This release is effected by operation of the total-key lever 130, which is connected by a link 156 to an arm 157, fastened to a stub-shaft 158, journaled in a hub 159 extending from a bracket 160. Said bracket 160 together with a companion bracket 161 (Figure 3) forms a support for the total-key fulcrum-rod 131. The latch-bar 153 is also pivoted between said brackets 160, 161, as seen in Figure 3, and is urged to swing downwardly, by a spring 163 reacting against an ear 164 of bracket 161. The brackets 160, 161 are secured by screws 166 to cross-member 167 of the computing-base framework. Rising from said cross-member 167 are register-supporting plates 168, which may be arranged to support the feeler-lever fulcrum-rod 144.

Upward swing of the arm 157 by operation of the total-key 133 causes the end of said arm to displace a cam-nose 170 of a by-pass-piece 171, pivoted at 173 to an ear 174 rising from the latch-bar 153, the latter being thus lifted to release the feeler-trains. Said by-pass-piece 171 normally bears against a stop-pin 176 on the ear 174, under the pull of a spring 177, anchored to said ear.

The total-key lever 130 and connected parts reassume their normal positions under the pull of a spring 179, said normal positions being determined by abutment of the arm 157 with a pin 178 projecting from bracket 160, Figure 3. In the total-key stroke, the cam-nose 170 is passed over by the end of arm 157, so that the relatching of the latch-bar 153 is not dependent upon release of the total-key by the operator's finger. The by-pass-piece 171 is idly swung about its pivot 173 by downward passage of the end of the arm 157 and restoration of the total-key is therefore not dependent upon said relatching.

The several contact brushes 137, when released to different positions along the contact block 151, as determined by co-operation of the feelers 134, as released by the total-key cause the selection of corresponding solenoids 185 for the numeral-type-key trains and space-key train of the typewriting mechanism. One terminal of the winding of each numeral-printing solenoid from zero to nine has its counterpart in and is connected to a conductor 187 of the contact block 151. The several contact-block conductors 187 extend crosswise of the mechanism, so that any one conductor 187 may be contacted by any brush 137. The contact block 151 and its conductors 187 have the arcuate arrangement corresponding to the circular sweep of the brushes as seen in the drawings. Upon operation of the total-key, the contact brush 137 related to each dial-wheel will make contact with the conductor 187 which represents the dial-wheel position.

In Figure 8, the illustrated dial-wheel is at the seven-position, and the feeler 134 for that dial-wheel, resting against the stop 135 of corresponding gradation, will have caused the related brush 137 to have moved to the conductor 187 representing the solenoid for the seven-type-key train. Other contact-brush positions corresponding to other dial-wheel positions are determined by corresponding depths of the graded stops 135. Thus, for the zero-position of the dial-wheel, the movement of the feeler 134 is the least, and, for the nine-position of the dial-wheel, the feeler movement is greatest. Since the slots which form the graded stops 135 as seen upon the detent-disks 89 also serve as detent notches for the cooperating detent-levers 90, it results that each feeler has an idle movement from its normal position before it comes within range of the graded stops 135. This idle movement arises from the necessity of retracting the feelers entirely clear of the detent-disks 89, so that ordinary rotation of the dial-wheels is not obstructed. Furthermore, this idle or excess movement of the feelers permits the contact brushes 137, in their normal position, to be fully retracted from the contact block 151. Movement of the contact brushes 137 into solenoid-selecting positions is not of itself effective to energize the solenoids, since it is desired that the latter be energized, one by one, for individual operation of the numeral-type-key trains. Following operation of the total-key, the typewriting-machine carriage 37, is by operation of the tabulating-key lever 51, tabulated to the highest denomination in the computing or total-printing zone, and the solenoid selected for that denomination is caused to be energized, as will now be described.

Each contact brush 137 has an extension presenting an arcuate surface 192, which, in any effective brush-position, is opposite a contact arm 193. There is one of said arms 193 for every brush, that is, for every denomination, and the several contact arms 193 are individually swingable upon a common fulcrum-rod 194, and are normally in such position that they do not make contact with the arcuate contact surface 192. The carriage 37, as it reaches the highest denomination-position to which it is tabulated, as aforesaid, moves the first contact arm 193 against its contact surface 192, thereby energizing the solenoid which is to be operative at that denomination. The resulting operation of the typewriting mechanism causes said carriage 37 of the latter to escape to the next denomination to move the next contact arm 193 and concomitantly cause restoration of the first moved contact arm. The several contact arms 193 are thus brought against their contact surfaces 192 seriatim, and, for this purpose, the usual denomination-selecting trains associated with the pin-bars 61 and operable seriatim may be employed. To this end, the arms 71 of the several transposing levers 69 of said denomination-selecting trains are enabled to actuate the contact arms 193, each arm 71 being connected to a corresponding contact arm 193 by a link 196. Said link may be formed as seen in the drawings, and is pivotally connected at its rear end to the contact arm 193. At its forward end, each link 196 is perforated to slip over the transposing lever-arm 71.

It is desired when a total is printed, as a result of operation of the total-key 133, that the dial-wheels 62 be cleared or restored to their zero-positions in a machine cycle which follows the printing operation. Operation of said total-key 133 therefore releases the usual subtraction-setting member 198, held in its normal position against the pull of a driving spring 199 by a latch 200, Figure 3.

The total-key-operated stub-shaft 158 has fastened thereto an arm 201, connected by a link 202 to an arm 203, which is loose on a shaft 204, to which said subtraction-latch 200 is fastened, and which is urged to latching position by a spring 195. Said arm 203, engaging a pin 205 of said latch, is effective to displace the latter upon operation of the total-key. The arm 203 is freely retained between the latch 200 and a collar 206 on the shaft 204. Upon release of the subtraction-setting member 198 by operation of the total-key, said member rocks the usual shaft 208, Figure 8, to shift the pin-setting rock-shafts 56 endwise, so that the latter, instead of actuating the pin-setting bars 59, of the additive value of the numeral-keys, will actuate the bars corresponding to the subtractive complements of said values. The endwise shifting of said rock-shafts 56 also renders effective at any numeral-key operation the usual bar 209 for restoring the nine-pin whenever any other pin is set in the pin-bar 61, it being understood that the setting of the machine for subtraction also causes through the rocking of shaft 208 and operation of the usual connections indicated at 210, Figure 8, the pre-setting of all the nine-pins. The operation of the subtraction-setting mechanism is fully set forth in the aforesaid Minton patent. Figure 8 shows the subtraction-setting member 198 as having been released by operation of the total-key 133.

Each solenoid 185 has a movable plunger 211 working within a non-magnetic sleeve 212, Figure 1, of narrow rectangular section. Said sleeve has end flanges 213 and 214 to form a bobbin, upon which is placed a solenoid-winding 215.

A C-shaped laminated iron frame 216 for the magnetic circuit encompasses the solenoid-winding 215 as seen in Figure 1, and its yoke-portion reaches into the sleeve 212 to form a pole-face 217 opposite the inner end of the solenoid-plunger 211. The ends of said frame 216 may abut the top and bottom of the bobbin-sleeve 212, which may extend beyond the bobbin-flange 214. The inner laminations of said frame 216 may be arranged to clear a non-magnetic link 218 extending through the yoke-portion, from the solenoid-plunger 211, for connection to the parts actuated by the plunger. The laminations of the frame 216 are clamped between outer plates 219 drawn together by screws 220. All the solenoids 185 are supported upon a plate 221 by means of flanges 222 formed on said clamp-plates 219, the solenoids being secured to the supporting plate 221 by screws 223. The supporting plate 221 has perforations 224, Figure 2, for clearing the solenoid-plungers and is supported and fastened by screws 225 between bracket-plates 226 and 227 formed as seen in Figures 2 and 5, for attachment to the rear edge of a platform 228 by screws 229, Figure 2. Said platform may be part of the usual stand on which rests the combined typewriting and computing machine.

The plungers 211 for the printing solenoids are each connected to the bell-crank 25 of the corresponding numeral-printing type-action by a link 230. The rear end of each link 230 is connected to the solenoid-plunger link 218, at 231. The forward end of each link 230 has a slot 232 for articulation with a headed stud 233 presented by the type-action bell-crank 25. Each type-action is manually operable independently of the solenoid-train. The plunger 211 for the space-key solenoid operates through a link 234 having at its forward end a slot 235 for articulation with a headed stud 236 of an arm 237 fastened to the space-key rock-shaft 47. Where necessary, for clearing parts of the machine, the links 230 and 234 may have bends as at 238, 239, Figure 5.

The total which is to be automatically printed may have a less number of denominational places than the set of dial-wheels 62. In the diagram at Figure 16, the total 6 740 43 is displayed in a dial-wheel set having nine wheels, and the three dials ahead of the wheel showing the first significant figure of said total display zeros. Said diagram represents the set of contact-block conductors 187 and the positions of the brushes 137 as determined by said total represented in the full set of wheels 62. Thus the contact brushes 137, related to the first three dial-wheels at zero-position, are shown in the diagram as making contact with the zero-conductor 187.

Each of the conductors 187 for the digits from one to nine has a direct connection 242 to one of the two terminals of a corresponding printing solenoid. The conductor 187 for zero has no such direct connection to the zero-printing solenoid, because it is desired that the latter shall be inoperative for each dial-wheel, ahead of the first significant figure, which registers a zero. In such case, instead of the zero-solenoid being operative, the space-key solenoid, represented in the Figure 16 diagram, is rendered operative. Following the printing of the first significant figure "6", the zero-solenoid, however, is to be operative, so that all zeros after the first significant figure of the total may be printed, and it will be seen therefore that operation of the space-solenoid by way of the zero-conductor 187 must be cut out at the printing of the first significant figure. A two-way tumbler-switch 243 is accordingly provided and is operative, when thrown one way, to bridge a pair of contacts 244 for cutting in the space-key solenoid and to bridge another pair of contacts 245, when thrown the other way, to cut in the zero-printing solenoid, the switch being arranged so that when one of these solenoids is cut in, the other one is cut out. As seen in the diagram at Figure 16, the zero-conductor 187 is connected to one of each of the pairs of contacts 244 and 245. The other one of the pair of contacts 244 is connected to the space-solenoid by a lead 246, and the other one of the pair of contacts 245 is connected to the zero-solenoid by a lead 247. The Figure 16 diagram also represents the set of circuit-completing contact arms 193, and also represents a work-sheet 236ª on which the total is automatically printed. The denomination-selecting trains and the denomination selector or tappet 64 on the typewriter-carriage are also represented in Figure 16, said trains being represented by their jacks 65 operative as hereinbefore described to actuate the circuit-completing contact arms 193 in the transposed denominational order represented in the diagram. The printing solenoids from zero to nine and the space-solenoid have a common connection 249 (see Figure 16) to a contact 250 of a circuit-disabling-tumbler switch 251 whose function will be described presently. Another contact 252 of said switch 251 is connected to one side 253 of the current-supply line represented by the plug 254. The switch 251 is normally in such position that its contacts 250 and 252 are bridged. It will be seen now that when the typewriting-machine carriage 37 is tabulated to the highest denomination, the jack 65 at the extreme right of Figure 16 will be actuated, causing the circuit-completing contact arm 193 for that denomination to be closed upon the arcuate contact surface 192 presented by the brush 137, the latter engaging the zero-conductor 187, since the dial at that denomination stands at zero. The two-way switch 243 will not be in the Figure 16 position, since Figure 16 shows a later stage of the total-printing operation which will presently become clear. Instead said two-way switch 243 will be in position to bridge the contacts 244, and consequently, instead of the zero-solenoid being operative, the space-key solenoid will be operative at the highest denomination. Thus, when the carriage arrives at said highest denomination, the space-key solenoid will be energized through the following circuit: Through one side 255 of the supply-line, the common fulcrum-rod 194 for the contact arms 193, the highest denomination contact arm 193, brush-extension surface 192, the brush 137, the zero-conductor 187, the bridged contacts 244, the lead 246, the space-solenoid, the lead 249, and thence through the closed switch 251 to the other side 253 of the supply-line. The space-solenoid being thus energized at the highest denomination, its plunger will be actuated, and will, by means of the link 234 and arm 237, actuate the space-key rock-shaft 47, to rock the escapement dogs 31, 33 in rearward direction. Said escapement dogs having been thus rocked, the space-key solenoid is then de-energized to permit the return of the dogs and the space-key train for stepping the carriage 37 one letter-space. For so de-energizing the space-solenoid, the circuit-disabling switch 251 is operated to break the connection between the contacts 250 and 252.

Means whereby the switch 251 is opened by the space-key solenoid include a projection 257 on the space-solenoid link 234, so that said link by its forward movement from the Figure 2 position may operate a universal bar 258, mounted on a rock-shaft 259, said rock-shaft having an arm 260 connected by a link 261 to an operating lever 262 of the switch 251. Said universal rock-shaft 259 may be journaled in the bracket-plates 226, 227.

The disabling switch 251 may be any suitable type of snap switch. The one illustrated includes a bridging bar 264, Figure 5, movable along an insulated saddle 265 between positions for opening and bridging the contacts 250, 252. A push-rod 266 for said bar 264 has a pin-and-slot connection with the switch-lever 262, to form with the latter a toggle breakable to either side of dead center. A spring 267 surrounds the push-rod and is compressed between the end of said switch-lever 262 and a shoulder at the base of said push-rod.

With the disabling switch 251 in the Figure 5 position, the first part of the movement of its lever straightens the toggle and compresses the spring 267 without moving the bridging bar from the contacts 250, 252. It will be evident that further movement of the lever 262 will bring the toggle past its dead center. The force of the spring 267 will thereupon be directed to suddenly snap the bridging bar 264 away from the contacts 250, 252, and project it into the opposite corner of the saddle 265. By similar operation of the parts, the switch is closed again by swinging its lever 262 the opposite way. The movement of the switch-operating link 261 need only be enough to move the switch-lever 262 until the spring 267 becomes effective to snap the bar 264 one way or the other, said spring thereupon operating to complete the movement of said switch-lever 262. Said link 261 therefore has a pin-and-slot connection 268 to the switch-lever, arranged to start said lever in either direction and permit the latter to complete its movement without further movement of the link.

The described switch 251 and its operating train from the universal bar 258 are arranged to break the space-solenoid circuit after the latter has been maintained long enough to have caused the carriage-escapement dogs 31 and 32 to have rocked rearwardly, to the Figure 8 position. The usual space-key-restoring spring 270, Figure 2, thereupon restores the space-key train, causing the dogs 31, 33 to move forward again. By the described operation of said dogs by the space-solenoid, the carriage 37 takes the usual step to the next denomination or space.

For causing the disabling switch 251 to be closed again, so that it may function for the next denomination or space, the switch-operating rock-shaft 259 has an arm 272 carrying a fly-weight 273, which is lifted when said shaft is rocked by the space-solenoid to open the switch 251. The resulting described de-energization of the solenoid permits said weight to drop again, thereby swinging the rock-shaft 259 the opposite way to reclose said switch 251 in correlation to the arrival of the carriage at said next denomination or space. Said weight 273 has a speed-regulating function which will be described later.

According to the diagram at Figure 16, said next space at which the carriage arrives corresponds to a punctuation-space and requires operation of the space-solenoid again by way of a punctuation-space circuit, which may be called into use by means of the previously-described key-locking mechanism operated at each punctuation-space. To this end, there extends from one of the coupled levers 111, Figure 4, operable by any punctuation-space jack 65ᵃ, a link 275 connected to a circuit-completing contact arm 276 mounted on the same fulcrum-rod 194 with the other contact arms 193. Said space-contact arm 276 is thus, by operation of any space-jack 65ᵃ, swung rearwardly against a fixed contact bar 277 extending downwardly from the contact block 151. The circuit for operating the space-solenoid for a punctuation-space is as follows: Supply line side 255 to fulcrum-rod 194, punctuation-contact arm 276, contact bar 277, thence by lead 278 to the space-solenoid, from which the circuit continues through the common solenoid-lead 249 and the closed switch 251 to the other side 253 of the supply line. The arm 276 is urged away from the contact bar 277 by means of a spring 279, Figure 4.

Thus, at the operation of the space-solenoid by means of the first punctuation-space jack 65ᵃ encountered by the carriage, the latter is stepped to the next denomination, which, in the Figure 16 diagram, is that for the second dial-wheel 62 from the left. Since the dial here stands at zero and the contacts 244 of the two-way switch 243 are still bridged, the space-solenoid will again be operated to step the carriage to the third wheel denomination. Here the dial-wheel also displays zero, and therefore the space-solenoid is again operated, bringing the carriage now to the fourth dial-wheel denomination.

At the fourth denomination, the dial-wheel displays six, the first significant figure of the total. The contact brush 137 for said fourth dial-wheel therefore is in position against the contact-block conductor 187 for the solenoid operating the six-numeral-key, the circuit being completed by the contact arm 193 at said fourth denomination resting against the contact surface 192 of the brush. The printing solenoid for six is therefore energized by the following circuit: Supply-line side 255, fulcrum-rod 194, contact arm 193, at the fourth denomination, conductor 187 for the six-solenoid, thence by the connection 242 extending to said solenoid, from which the circuit is completed by way of the common solenoid-lead 249, closed switch 251, and the other side 253 of the supply-line.

All zeros after the first significant figure are to be printed, and, therefore, at the printing of said first significant figure, the space-solenoid is disconnected from the zero-conductor 187, and the zero-solenoid, instead, is connected to said conductor. At the printing of the first significant figure, the two-way switch 243 is therefore thrown to the Figure 16 position, in which a circuit to the space-solenoid by way of the contacts 244 is broken and a circuit is established to the zero-solenoid by way of the contacts 245.

The first operation of any significant figure-solenoid from one to nine is effective to so throw said switch 243. An operating lever 280 of said switch 243 is connected to a universal bar 281 mounted on a rock-shaft 282, journaled in the bracket-plates 226, 227. An arm 283 of said rock-shaft 282 is connected by a link 284 to said operating lever 280. The switch 243 operates similarly to the described operation of the switch 251 in respect to the snapping of its bridging bar to either one of its two positions.

The link 230 for each printing solenoid, from one to nine, has a projection 286 engaging the universal bar 281 for operating the latter to throw the switch 243. Each projection 286 may be combined in one plate 287, with a projection 288 for operating the disabling switch universal bar 258. The plates 287 are adjustably secured to their links as indicated in Figure 5, by screws 289.

At each operation of a printing solenoid from zero to nine, the disabling switch 251 is opened and reclosed by means of the universal bar 258 and fly-weight 273 as described for operation of the space-solenoid. The link 230 from the zero-solenoid needs only a single projection 290, which is for operating the disabling switch universal bar 258, there being no need for the zero-solenoid operating the two-way switch 243, since the zero-solenoid is not for a significant figure. The projections 257 and 290 for the space and zero solenoid-links may also be formed on plates 291 adjustably secured by screws 292.

The two-way switch remains in the Figure 16 position while all the remaining figures of the total are completed, the printing of all figures, including zeros, after the first significant figure, and the interposition of punctuation-spaces wherever necessary, being effected one by one by means of the appropriate solenoids in a manner which will now be clear from the preceding description of operations.

The Figure 16 diagram represents the seven-solenoid as being energized at the denomination which corresponds to the fifth dial-wheel from the left, said fifth wheel displaying seven. It will be understood that, in the course of automatic total-printing, the contact arms 193 are operated seriatim, as the carriage 37 moves through the total-printing zone, there being interposed in said seriatim operation an operation of the contact arm 276 to energize the space-solenoid at each punctuation-space.

The fly-weight 273 oscillates up and down under the recurring impulses of the universal bar 258 during the course of total-printing. Its natural vibration period or beat therefore determines the speed of consecutive solenoid-operations. For varying said period of vibration, and hence regulating the intervals between successive solenoid-strokes, the fly-weight 273 is mounted so that it may be set at different distances from the rock-shaft 259 on which it is mounted, the mass of said fly-weight 273 being preferably a suitably fixed factor. The arm 272 may accordingly be provided with a slot 294 through which pass screws 295 by which the fly-weight is secured to said arm. The slot 294 permits adjustment of the fly-weight 273 along the arm 272. For limiting the movements of the fly-weight 273, there may project from the bracket-plate 226 stop-pins 296 cooperating with the fly-weight rock-shaft arm 260.

The fly-weight 273 functions to store switch-operating energy at the start of the solenoid-stroke so that the solenoid is relieved in great part of the burden of opening the deenergizing switch 251 just at the moment when said solenoid is about to be de-energized. There is thus available such unimpeded momentum of the solenoid-operated type-train as is needed for smoothly completing the printing stroke and permitting normal rebound of the type-bar from the platen. The necessity for using burdensome restoring springs is avoided because the return beat of the fly-weight co-operates to restore the parts after each power-stroke.

The fly-weight conduces to smooth succession of the automatic type-train and space-bar operations and the speed of succession may be regulated by shifting said fly-weight 273 along the arm 272.

The upper dotted circle 273ª, Figure 8, represents the limit of upward movement in the natural beat of the fly-weight 273. It will be noted that the pin-and-slot connection 268 to the switch-lever 262 is arranged to permit the fly-weight to freely reach the limit of its upward beat. The small dotted circle 258ª adjacent the universal bar 258 represents the position of the latter when the solenoid is de-energized, and hence said small circle indicates that the completion of the printing stroke is made under the momentum of the parts of the solenoid-driven train.

The contact block 151 may be secured by screws 298 between upstanding plates 299 having forwardly-reaching arms 300 secured by screws 301 to a cross-member 302 of the machine-framework. The current-conducting fulcrum-rod 194 for the carriage-operated contact arms 193, 276 is supported by said plates 299 in insulating bushings 303. Said plates 299 also support a cross-bar 304 having upper slots 305 in which the rear or rack ends of the brush-arm links 147 are slidably seated. Said bar 304 may be of such height that its slots 305 also guide the contact-brush arms 138, the bar having a groove 306 through which passes the brush-arm fulcrum-rod 139. The links 196, 275 from the contact arms 193, 276 are laterally guided by lower slots 308 in said cross-bar 304 and are connected to said current-conducting contact arms by insulators 309. Said contact arms may have individual hubs 310 to space them apart and to make broad contact with the fulcrum-rod 194. At their forward ends the contact-arm links 196 slidably bear in slots 311, Figure 5, of an upward extension 312 of the usual spacing comb 313, in which play the co-operating levers 67 and arms 70 of the denomination-selecting trains for the pin-bars 61.

At the escape of the typing-machine carriage 37 after the last figure of the total has been automatically printed, the counter-stop 53 on said carriage actuates the usual lever 316, Figure 2, effective through the usual connections, not shown herein but described in said Minton patent, to initiate a power-driven machine cycle. During said cycle the cross-bar 72 of the general operator advances, and in such advance the pins set during the total-printing operations are encountered, and the pin-bars are thereby driven to clear the dial-wheels 62, it being remembered that the pins 60 were set subtractively on account of the operation of the total-key 133 which preceded the described total-printing operations. The machine may also be manually cycled by means of the usual handle 86.

Before the general-operator cross-bar 72 encounters any of the set digit-pins 60, it moves idly. There is thus afforded time for first effecting withdrawal of the feelers 134 so that they may not interfere with rotation of the dial-wheels 62. The general-operator cross-shaft 83 has a pair of cams 317 for actuating a pair of levers 318, between which is supported a restoring plate 319, said levers 318 being pivoted at 320 upon brackets 321 extending from the register-side plates 168. The restoring plate 319 has downwardly-extending fingers 322 for engaging pins 324 upon the feeler-links 147. The restoring cams 317 are arranged to swing the plate 319 to the Figure 13 position before the dial-wheels are started upon their rotation. The feeler-links 147 are thereby drawn rearwardly, the feelers 134 and brushes 137 are retracted, and the latch-bar 153 is dropped into holding position. Rfererring to Figure 6, it may be noted that the pin-bars 61 may advance somewhat before the pawl 77, connected to the pinion 75, drives the ratchet 76, connected to the dial-wheel. The period for swinging the plate 319 at the start of the cycle may therefore be augmented by the period in which the pin-bar moves idly as just described.

The restoring cams 317 have, as seen in the drawings, a dwell to insure that the feelers 134 cannot drop toward the dial-wheels again while the latter are being rotated. The movement of the general-operator cross-shaft 83 is oscillatory, and thus by said dwell the restoring plate 319 is held in its Figure 13 position until its levers 318 drop off the restoring cam 317 at the end of the cycle. During the machine cycle, the subtraction-setting bar 198 is restored and re-engaged by its latch 200, and the pin-setting mechanism is consequently restored to its normal additive state as set forth in said Minton patent. When the restoring-plate levers 318 drop off their cams 317 at the end of the cycle, the feeler-links 147 settle against the latch-bar 153 under the pull of their springs 150 which may be attached to an anchor-plate 326 secured to the cross-member 302 of the framework, Figure 5.

At the start of a machine cycle, the shaft 120 is rocked as already described for dropping and thereby disabling the denomination-selecting tappet 64. The rocking of said shaft 120 may be employed to reset the two-way switch 243 to bridge the contacts 244, thereby reconnecting the space-solenoid to, and disconnecting the zero-solenoid from, the zero-conductor 187. Thus, when a new total is to be printed, the space-solenoid will be operative to automatically step the carriage along to the denomination where the first significant figure appears in the dial-wheels. Said shaft 120 has fastened thereto a downwardly-extending arm 327 which may be connected by a link 328 to the arm 283 which, it will be remembered, was moved by the universal bar 281, at the printing of the first significant figure, to the Figure 8 position for throwing said switch 243 to cut in the zero-solenoid. The swing of said arm 327 at the start of the cycle to the dotted-line position 327ᵃ of Figure 8 causes the switch 243 to be thrown back to the position, Figures 2 and 5, wherein the space-solenoid is cut in.

At the automatic printing of a sub-total, the dial-wheels 62 are not to be rotated to zero-position. The sub-total may be printed in a zone or column in which the denomination-selecting tappet 64 on the typing-machine carriage 37 is ordinarily effective to advance the pin bars 61 to pin-setting positions, and consequently digit-pins 60 corresponding to the automatically operated numeral key-levers 23 will be set during sub-total printing.

A sub-total-key mechanism is provided for initiating the automatic printing of a sub-total and automatically effecting elimination of any setting of the digit-pins 60, so that the dial-wheels 62 will not be rotated in the machine cycle which may ensue, as will be explained, upon the printing of the last digit of the sub-total. At the operation of said total-key mechanism, the described solenoid-selecting trains, including the feelers 134 and contact brushes 137, are released to co-operate with the dial-wheels 62 for selecting the solenoids corresponding to the figures of the sub-total. The typing-machine carriage 37 is then tabulated to the highest denomination by operating the tabulating-key lever 51, whereupon the energization of the selected solenoids, one by one, proceeds as described.

The sub-total-key mechanism includes a sub-total key 330, Figure 3, mounted on a lever 331, having a hub 332, whereby it is freely pivoted upon the fulcrum-rod 131 that serves the total-key lever 130. A link 333 enables said lever 331 to lift an arm 334 for raising the latch-bar 153, and thereby release the described solenoid-selecting trains. Said arm 334 engages a by-pass-piece 335 similar to the by-pass-piece 171 operated by the total-key 133, said by-pass-piece 335 being pivoted upon an ear 336 rising from the latch-bar 153 and normally drawn against a stop-pin 337 by a spring 338.

For eliminating the setting of any digit-pins 60, operation of the sub-total-key mechanism may connect the usual mechanism, whereby the pin-restoring platform 94 is actuated, to the cycling mechanism in such a way that any set digit-pins 60 are caused to be restored at the start of a machine cycle before the general-operator cross-bar 72 has advanced far enough to rotate any dial-wheel 62.

Operation of the subtotal-key lever 331 therefore swings an arm 340 downwardly, said arm 340 being connected by a hub 341 to the latch-lifting arm 334, and the resulting lever being pivoted upon a stud 342, fastened in a hub 344 projecting from the bracket 161. The arm 340 in its downward swing engages a by-pass-piece 346, pivoted at 347 to a lever 348, pivoted, see Figure 2, upon the pin-restoring bar 102 whose rearward movement is effective, as previously described, to raise the pin-restoring platform 94. Said lever 348 thus rocked has a hook 349 thereof swung upwardly opposite a finger 350 of the restoring plate 319, which, it will be remembered, is swung rearwardly by means of the cams 317 at the beginning of a machine cycle. For holding the lever 348 in its effective pin-restoring position of Figure 9, or in its retracted position of Figure 2, said lever has pivoted thereon a spring-pressed detent 352 co-operating with a detent-nose 353 formed as seen best in Figure 2 and fastened to the pin-restoring bar 102. The piece forming said detent-nose 353 may have a ledge 354 underlying the rearwardly-extending arm of the lever 348, and thereby limiting downward movement of said arm.

Figure 12 shows the pin-restoring lever 348 on the bar 102 in effective position, and also shows how said bar 102 has been drawn rearwardly by the finger 350 to effect the raising of the pin-restoring platform 94, any set digit-pins 60 being thereby restored. It will be noted, in Figure 12, that the cams 317 have not fully moved the restoring plate 319, and that the pin-restoring bar 102 is therefore subject to further rearward movement, even though the pin-restoring platform has reached the limit of its upward movement. In such further rearward movement of the bar 102, the usual spring 104 will yield, it being remembered that said spring co-operates with the rod 104ᵃ therein to form a yieldable connection between the bar 102 and the pin-restoring lever 105, Figure 9.

Since the restoring plate 319 is maintained by the dwell of the cams 317 in its rearwardly-swung position almost to the end of the cycle, the pin-restoring platform 94 is therefore urged upwardly throughout the greater part of the cycle. Said platform 94, in order not to interfere with the forward movement of the general-operator cross-bar 72, has a cam-edge 358 co-operating with a cam-edge 359 of said cross-bar 72, enabling the latter to cam the platform 94 downwardly in its forward passage. During such downward camming of the platform 94, the spring 104 yields, the position of the parts at this stage being indicated in Figure 13, wherein it may also be noted how the solenoid-selecting trains have been retracted and how the latch-bar 153 is in position to hold said trains again.

At the end of the machine cycle, when the levers 318 for the restoring plate 319 drop off the cams 317, said plate 319 swings forwardly under the pull of a spring 361. The pin-restoring bar 102 is then free to resume its normal position under the pull of the spring 103, the pin-restoring platform and related parts being also restored to the Figure 2 position. It will be remembered that the lever 348, mounted on said bar 102, is yieldably held in its pin-restoring position by the described detent-devices. Said lever 348 is provided with an incline 363 on its rearwardly-extending arm, said incline encountering a pivoted by-pass cam-piece 364 when the bar 102 is drawn forwardly by its spring 103. By such encounter of the incline 363 with the cam-piece 364, the lever 348 is forcibly restored to its normal position. The cam-piece 364 is spring-pressed against a stop 360 and pivoted at 365 upon a bracket 366, in order that it may be by-passed idly by said incline 363 when the bar 102 is driven rearwardly by the general operator. The restoring-plate spring 361 is anchored to said bracket which may be secured to the cross-member 167 of the framework.

The by-pass-piece 346 of the forwardly-extending arm of said lever is weighted below its pivot 347 to normally bear against a stop-pin 367, Figure 9, said by-pass-piece 346 serving to permit immediate free return swing of the arm 340 after the latter has swung downwardly to swing the lever 348 to effective position.

It may happen in certain computations wherein several amounts are debited against a balance standing in the dial-wheels 62 that said dial-wheels eventually register a minus amount or overdraft as a result of repeated subtractions. Said subtractions being effected by the described complementary method, it results that the overdraft or minus quantity is represented in the dial-wheels by the complement of the true amount. It is evident that such complementary amount is not to be printed through the medium of the automatic total-printing mechanism, and the following means are provided to lock the total and sub-total key-mechanism against operation when the dial-wheels register an overdraft.

It is characteristic of a complementary minus amount, as registered by the dial-wheels, that all the wheels to the left of the first significant figure of said amount register nines. Each dial-wheel, except the wheel of highest denomination, needs the usual carry-over tooth for co-operation with the carry-over devices 87. For the purpose of the invention, said wheel of highest denomination may be provided with a similar tooth 375, Figure 15, which, when said highest wheel is at the nine-position, actuates mechanism to lock the total-key mechanism. Upon the top of the usual cross-bar 376, in which the front ends of the usual pin-bars are guided, there is mounted a bracket having forwardly-extending, spaced ears 377, Figure 14. In said ears there is journaled a headed stud 378 riveted into an arm 379 having a cam-nose 380, Figure 15, lying in the path of the tooth 375 of the highest denomination-wheel. Said arm is yieldingly held in said path by a spring 381 carried by said stud 378 and reacting upon one of the ears 377. Upon the rod 144 which carries the feeler-levers 143, there is pivoted a lever 383, Figure 15, connected by a link 384 to the arm 379 whose cam-nose 380 lies in the path of the tooth 375. When the wheel of the highest denomination stands at nine, see Figure 15, its tooth 375 is opposite said cam-nose 380 and therefore displaces the arm 379 rearwardly, thereby causing the end of a downwardly extending arm 385 of said lever 383 to be in position to oppose upward displacement of the latch-bar 153. Operation of either the sub-total key 330 or the total-key 133 is thereby prevented and the operator is apprised when trying to operate said keys and finding them so locked that the dial-wheels probably register a minus total.

If the minus total or overdraft is to be printed, the operator copies, by manual operation of the numeral-type-keys, the complement of the total as displayed by the dial-wheels, this being the usual practice in printing a minus total. It will be noted that the mechanical reading devices associated with the dial-wheels for selecting the solenoids do not obstruct visibility of the dial-wheel figures at the usual sight-opening 386 in the computing-mechanism casing 132.

During the manual printing of the minus total, digit-pins are set additively in case it is desired to clear the register to zero, the machine being cycled after printing the last figure of the sub-total. When the register is not to be cleared at the printing of a minus total, the error-key, Figure 13, may be operated to cancel the setting of the digit-pins before the machine is cycled. When the wheel of the highest denomination stands at any other than the nine-position, the spring 381 will maintain the parts in such position that the lower arm 385 is in the dotted-line position 385ᵃ of Figure 15, which corresponds to the full-line position, Figure 3. Figure 3 shows the said parts which are subject to the tooth 375 in their normal positions. Thus, in the Figure 3 position, the latch-bar 153 is free of said arm 385 and the total-key mechanism is therefore operative.

The subtotal-key train is urged to normal position by spring 388, Figure 3, said normal position being determined by abutment of the arm 340 of said train with the lower edge of the framework-cross-member 167, Figure 2.

As seen in Figure 10, each conductor 187 is fitted into a slot of the contact block 151 so that the conductors have the illustrated arcuate and radial arrangement in which their lower edges may be engaged by any one of the contact brushes 137. Said brushes 137, having the spring-like form as indicated, move with resilient pressure over the contact block 151 and its conductors 187. Said pressure may serve to brake the feeler-trains as they move against the stops 135. At each conductor 187 there is a hole 390 formed partly in the conductor and partly in the contact block. Each hole may be counterbored as at 391 to receive a socket 392 having a threaded stem 393 which is received in the hole 390, each conductor having threads at its hole-forming portion. Said socket 392, driven home by means of a screwdriver-slot 394, secures its conductor in the contact block and makes electrical contact with the latter. The contact bar 277 for the punctuation-space circuit is threaded at its upper end into a socket 395, both the latter and said bar 277 being imbedded in the contact block, from which said bar extends downwardly, as seen in Figure 10. Each of the sockets 392, 395 has at its upper end a hole for detachably receiving a terminal-plug 396 attached to the leads 242, 278 and 368. The sockets 392, 395 may have the arrangement seen in Figure 11 and may be numbered according to the conductors to which they relate. There may be interposed in the supply-line a resistor 369, Figure 16, to limit the current supplied to the solenoids 185.

The operation of the machine will be readily understood from the foregoing description, and may be summarized as follows: At any stage in the computations for which the machine is used, the total, represented by the figures in the dial-wheels, may, unless said figures represent a minus total, be automatically printed either as a sub-total or as a register-clearing total.

For register-clearing total-printing, the total-key 133 is first pressed, thereby raising the latch-bar 153 and releasing the solenoid-selecting trains so that the feelers 134 move against those stops 135 which happen to be opposite each individual feeler. The series of stops 135 for each dial-wheel form in effect a digit-evaluating curve or spiral, and each co-operating feeler will therefore, as determined by said curve, move a distance corresponding to the position of its dial-wheel. The differential register-reading movements of the feelers 134 are translated into corresponding movements of the solenoid-selecting contact brushes 137 so that each brush engages the contact-block conductor 187 corresponding to the solenoid which represents the figure represented by the dial-wheel. Thus, as indicated in the diagram at Figure 16, the set of contact brushes 137 contact those conductors 187 which correspond to the dial-wheel positions shown in said Figure 16.

Operation of the total-key 133 also conditions the pin-setting mechanism for subtraction. Following operation of the total-key 133 and the resulting shift of the contact brushes 137 from their normally retracted positions, the carriage 37 is tabulated to the highest denomination, whereupon energization of the selected solenoids, one by one, commences as soon as the first contact arm 193, at the highest denomination, is closed upon its contact surface 192. After the printing of the last figure of the total, the machine is automatically cycled by means of the counter-stop 53 which reaches the cycle-initiating lever 316 as the carriage takes the usual letter-feeding step after the printing of said last figure. During the cycle the dial-wheels are rotated to zero-positions, by means of the digit-pins 60 that were set subtractively during the automatic total-printing operation.

For automatically printing a sub-total the key 330 is depressed. Like the total-key 133, the sub-total key releases the feelers 134 so that the solenoids may be selected by means of the contact brushes 137 according to the figures in the sub-total as registered in the dial-wheels. The sub-total key 330 also connects the pin-restoring platform 94 to the general operator as described so that all digit-pins 60, set during the printing of the sub-total, will be restored at the beginning of the machine cycle which follows the sub-total-printing operation, such restoration of the digit-pins preventing rotation of the dial-wheels 62.

Should it be found when attempting to operate either total-key 133 or 330 that the same cannot be moved, it will signify that the dial-wheels probably register a minus total. It will be evident that brief consideration of the character of the computations will avail to instantly determine whether the total-keys are locked by reason of the dial-wheel registering a minus total. Operation of the means whereby the total-keys are so locked has already been described. When the dial-wheels register a minus total, they display the complement of the true minus total. Thus, if the true minus total be 13 94 it would be displayed in the dial-wheels in its complementary form, namely, 9 999 986 06. The operator may, by manual operation of the numeral-keys 22, print the true minus total by copying the complement of the figures displayed by the dial-wheels. It will be evident that the clearing of the dial-wheels after printing a minus total will render the total-keys 133 and 330 operative again, it being understood that only when the highest-denomination dial-wheel stands at nine is the total-key-locking mechanism effective.

It will be noted that the solenoids 185, the switches 243, 251 and their operating trains, the contact block 151 and associate contact parts, and the carriage-operated contact arms 193, 276 are all grouped together at the rear of the machine. By such arrangement these parts are readily accessible, and grouped together as indicated they may be treated as a detachable unitary assembly.

Variations may be restored to within the scope of the invention, and portions of the improvements may be used without others.

Having thus described my invention, I claim:

1. In a computing machine having a set of digit-types and a carriage, the combination of a set of denominational totalizer-wheels, a set of type-operating electromagnets, a total-key, mechanical reading devices, one for each wheel, effective upon operation of said total-key to move differential distances and thereby assume positions representative of the digits registered in said wheels, contact means co-operative with said reading devices to select the magnets according to said digits, and means controlled by said carriage to energize the selected magnets consecutively.

2. In a computing machine having a set of digit-types and a carriage, the combination of register-mechanism including a set of denominational digit-evaluating spirals, rotatable to differential angular positions to register a total, a set of individually movable feelers engaging said spirals, each feeler assuming a position depending on the position of its spiral, a set of type-operating electromagnets, contact devices shiftable by said feelers for selecting the magnets, and means controlled by said carriage to energize the selected magnets consecutively.

3. In a computing machine having digit-types, a carriage, and a set of denominational register-wheels, the combination of type-operating electromagnets, magnet-selecting circuits including a set of conductors individually connected to corresponding magnets, a set of denominational contact members, each shiftable differential distances to contact any one of said conductors, means whereby the digit-representing positions of the register-wheels are translated into corresponding shifts of said contact members, and carriage-controlled means whereby the selected magnets are energized consecutively.

4. In a computing machine having a set of digit-types and a carriage, the combination of denominational totalizer-wheels, a set of type-operating electromagnets, a set of conductors individually connected to the magnets, a set of individually shiftable contacts, one for each wheel, engageable with said conductors, a set of feelers co-operative with said wheels to assume differential positions corresponding to the digits registered in said wheels, said feelers being connected to position said contacts differentially to accord with said feeler-positions and thereby cause the contacts to engage the conductors for selecting the magnets corresponding to said digits, and carriage-controlled means to energize the selected magnets consecutively, said feelers being in juxtaposition to said wheels, and said contacts and conductors being remote from said wheels.

5. In a computing machine having a set of digit-types and a carriage, the combination of denominational totalizer-wheels, a set of type-operating electromagnets, a set of conductors individually connected to the magnets, a set of individually shiftable contacts, one for each wheel, engageable with said conductors, a set of feelers co-operative with said wheels to assume differential positions corresponding to the digits registered in said wheels, said feelers being connected to position said contacts differentially to accord with said feeler-positions and thereby cause the contacts to engage the conductors for selecting the magnets corresponding to said digits, carriage-controlled means to energize the selected magnets consecutively, and total key-mechanism normally holding said feelers in retracted positions and operative to cause said feelers to assume said differential positions.

6. In a computing machine having singly-operable digit-types and a carriage, the combination with denominational totalizer-wheels, denominational drivers for said wheels, means whereby said drivers are indexed concomitantly with the operation of said types to print, and a general operator automatically cycled after the printing operations, to actuate said drivers, of a sub-total key, means whereby, at the operation of said key, said types are automatically operated under the control of said wheels and said carriage, to print the amount registered in said wheels, and means whereby operation of said sub-total key effects the disabling of said indexing means so that said wheels are not rotated during the general-operator cycle.

7. In a computing machine having singly-operable digit-types and a carriage, the combination with denominational totalizer-wheels, denominational drivers for said wheels, means whereby said drivers are indexed concomitantly with the operation of said types to print, and a general operator automatically cycled after the printing operations, to actuate said drivers, of a sub-total key, means whereby, at the operation of said key, said types are automatically operated under the control of said wheels and said carriage, to print the amount registered in said wheels, said general operator having an idle period at the start of its cycle before it can advance said drivers, and means, conditioned by operation of said sub-total key, whereby said general operator, during said period, eliminates any indexing effected in said drivers.

8. In a machine of the class described including singly-operated digit-types, a carriage, denominational totalizer-wheels and carriage operated denomination-selecting trains associated with said wheels; total-printing mechanism including a set of electromagnets, outside of the machine, individually connected to drive said types, shiftable magnet-selecting contacts and circuits therefor, digit-reading devices in juxtaposition with said wheels and connected to shift said contacts, and a series of contact members corresponding to and operable by said denomination-selecting trains to complete said circuits seriatim and energize the selected magnets consecutively, said contacts, circuits and contact members being also disposed outside of said machine and arranged to form, together with said magnets, a distinct unitary assembly mounted in juxtaposition to said machine.

9. In a computing machine having singly-operated digit-types and a carriage, the combination with denominational totalizer-wheels, drive racks for said wheels carrying digit-pins settable by operation of said types, and a general operator cycled subsequent to the printing operations, to engage the set pins and drive said racks, of a set of power-driven type-actuators, means whereby said type-actuators are selected according to the digits registered in said wheels, means controlled by said carriage whereby the selected type-actuators are operated consecutively to drive the types, two keys individually operative to render said selecting means and carriage-controlled means effective to automatically print the registered digits, and means whereby, consequent only to the operation of one of said keys and not to the operation of the other key, pins corresponding to the automatically printed digits are set so as to effect actuation of said drive racks in a subsequent cycle of said general operator.

10. The combination with a set of singly-operable printing types, a letter-feeding carriage, and a set of type-operating electromagnets, of contact means whereby the carriage at each step establishes a circuit for energizing a pre-selected magnet, a switch in said circuit, and an oscillatory weight coupled to the switch, said switch and weight throwable one way by any energized magnet to disable said circuit to de-energize the magnet after the latter has driven its type to print, said carriage in the ensuing step establishing, through said contact means, a circuit to again energize a pre-selected magnet, the completion of said latter circuit depending on the return swing of said weight and the concomitant return throw of said switch, the natural period of oscillation of said weight determining the speed of succession of printing strokes.

11. In a computing machine having singly-operable digit-types and a carriage, the combination of a set of denominational totalizer-wheels, each wheel having steps graded to represent the digits, a set of spring-pressed feelers for engaging said steps to assume differential wheel-reading positions, a key-controlled latch normally holding said feelers clear of said steps, a set of type-operating electromagnets, circuits including magnet-selecting contacts, one for each feeler, linkages connecting the feelers and contacts, and carriage-operated contact means for energizing the selected magnets consecutively and thereby driving the types to print, said feelers, linkages and contacts forming trains assuming wheel-reading and magnet-selecting positions upon withdrawal of said latch.

12. In a computing machine having singly-operable digit-types and a carriage, the combination of a set of denominational totalizer-wheels, each wheel having steps graded to represent the digits, a set of spring-pressed feelers for engaging said steps to assume differential wheel-reading positions, a key-controlled latch normally holding said feelers clear of said steps, a set of type-operating electromagnets, circuits including magnet-selecting contacts, one for each feeler, linkages connecting the feelers and contacts, carriage-operated contact means for energizing the selected magnets consecutively and thereby driving the types to print, said feelers, linkages and contacts forming trains assuming wheel-reading and magnet-selecting positions upon withdrawal of said latch, and means for retracting the released feeler-trains preparatory to subsequent rotation of the wheels.

13. In a typewriting machine, the combination with a set of types and a letter-feeding carriage, of a register in which an item is set up for subsequent automatic transcription, power-operated type-operators, and means, co-operative with said carriage, for actuating said type-operators according to the item set up in said register to automatically print the characters of said item seriatim, said means including an oscillatory mass started into movement by the first type-operator called into play in printing the first character, said mass operative by reason of its natural period of oscillation to control the speed of succession in the operation of type-operators for the succeeding characters of said item.

14. In a typewriting machine, the combination with a set of types and a letter-feeding carriage, of a register in which an item is set up for subsequent automatic transcription, power-operated type-operators, and means, co-operative with said carriage, for actuating said type-operators according to the item set up in said register to automatically print the characters of said item seriatim, said means including an oscillatory mass started into movement by the first type-operator called into play in printing the first character, said mass operative by reason of its natural period of oscillation to control the speed of succession in the operation of type-operators for the succeeding characters of said item, means being provided for varying said natural period of oscillation, thereby to adjust said speed of succession in the seriatim printing of said characters.

15. In a typewriting machine, the combination with a set of types and a letter-feeding carriage, of a register including type-selecting contacts by means of which an item is set up for subsequent automatic transcription, electromagnets, rendered potentially operative by the closing of the type-selecting contacts, for driving the selected types, contacts controlled by said carriage for energizing the magnets selected by the first contacts, thereby to automatically print the characters of said item seriatim, a switch common to all the magnets, and an oscillatory mass started into movement by the first type-operating magnet in printing the first character of said item and operative at the end of its stroke in one direction to open said switch and break the main circuit, and further operative at the end of its stroke in the return direction to re-establish said circuit, whereby said mass by reason of its natural period of oscillation controls the speed of succession in the operation of the types for the succeeding characters. *per C.C*

16. In a computing machine, a set of denominational totalizer-wheels, each having circumferentially-spaced digit-detent scallops, detents coacting with said scallops, and totalizer-reading mechanism including a set of digit-reading feelers, one for each wheel, shiftable from a retracted position to enter the notches between said scallops to assume differential positions indicative of the digits registered in the wheels, the several notches of each wheel being of graded feeler-arresting depths representative of the digits, the detent and feeler for each wheel being relatively disposed so as to coact with different notches of the wheel. *per C.C*

17. In a computing machine, the combination with totalizing wheels, denominational drivers therefor, and a general operator for the drivers, each driver carrying digit-pins settable to index an amount preparatory to running said amount into said wheels by a cycle of the general operator, of digit-types, a carriage, mechanism controllable by said wheels for reading a total and registering a selection of corresponding digit-types, a total-key, a sub-total key, means controlled by said keys and co-operating with said total-reading mechanism and carriage to operate the types consecutively for printing the total according to the registered selection of said digit-types, and means whereby consequent only to operation of the total-key, and not to operation of the sub-total key, digit-pins corresponding to the total are set in said drivers concomitantly with the operation of the selected types, so as to cause the totalizing wheels to be cleared by a subsequent cycle of the general operator.

18. In a machine of the class described, the combination of individually operable digit-types, a co-operative letter-feeding carriage, a set of totalizing wheels, and total-taking mechanism including a set of total-reading feelers, one for each wheel, said wheels having means engaged by said feelers, whereby the latter are enabled to assume differential positions indicative of the total, electromagnets, one for each digit-type and connected to operate same, and circuits including digit-selecting and denomination-selecting contact-devices controlled respectively by said feelers and carriage, whereby the proper magnets are selected, and are energized in denominational order to automatically print the total as indicated by said feelers.

19. The invention as set forth in claim 18, the digit-selecting contact-devices being differentially adjustable under control of said feelers to register for each denomination a selection of the digit-type magnet corresponding to the digit-representing position of the feeler, and the denominational contact-device being controlled by the carriage upon its entry in a total-taking zone to coact with the digit-selecting contact-devices to energize the registered magnets for the several denominations consecutively 20. In a machine of the class described, the combination of individually operable digit-types, a co-operating letter-feeding carriage, a set of totalizing wheels, denominational drivers for said wheels, a cycling general operator co-operative with the drivers for said wheels, and total-taking mechanism including a set of total-reading feelers, one for each wheel, said wheels having digit-evaluating spirals, engageable by said feelers, whereby the latter are enabled to assume positions indicative of the total, key-actuated means operable preparatory to total-taking to cause said feelers to move from retracted idle positions to engage said spirals, and circuits including digit-selecting and denomination-selecting contact-devices controlled respectively by the differentially positioned feelers and the carriage, whereby the proper magnets are selected and are energized consecutively to automatically print the total as indicated by said positioned feelers, means being provided whereby a general-operator cycle subsequent to the total-printing restores said feelers and the digit-selecting contact-devices.

21. In a computing machine having digit-types operable to print an amount digit by digit, and a letter-feeding carriage, the combination of denominational totalizing wheels, denominational drivers for said wheels, means whereby said drivers are indexed for an amount concomitantly with the operation of said digit-types to print said amount, a general operator cycled after the amount-printing operation, to actuate said drivers, to rotate said totalizing wheels to accumulate said amount, a set of spring-pressed digit-reading feelers, each wheel having a digit-evaluating spiral engageable by one of said feelers for reading a total, a feeler-restrainer normally holding said feelers clear of said spirals during the amount-accumulating rotation of said wheels, a total-key operable to withdraw said restrainer to cause said feelers to engage said spirals, a set of normally silent power-operated type-actuators selectable by said feelers according to the digit-reading positions of the latter on said spirals, means controlled by said carriage whereby the selected type-actuators are operated in denominational order for printing the total digit by digit, and feeler-retracting means, including a timing device, operatively connected to said general operator and acting at an initial portion of the general-operator cycle following the total-printing operation, to cause said feelers to be restored clear of said spirals and to be held by said restrainer until another operation of said total-key.

22. The invention as set forth in claim 21, means being provided whereby the total-printing operation of said digit-types indexes said drivers preparatory to subtracting the total from said wheels during said cycle which follows the total printing operation, said feeler-retracting means acting to restore said feelers during the cycle in advance of said subtractive rotation of said wheels, and then acting to recede before the end of said cycle to permit the functioning of said feelers at said other operation of said total-key.

23. In a computing machine having singly-operated digit-types, a letter-feeding carriage, denominational totalizing wheels, and electromagnets for operating said digit-types for printing a total; a contact mechanism including a series of transverse digit-representing conductors individually connected to said digit-magnets, a denominational set of individually shiftable digit-selecting contact-members, one for each wheel, differentially positionable, under the control of said wheels, to engage the digit-representing conductors corresponding to the digits registered in said wheels and thereby select the corresponding digit-magnets by partially completing the circuits therefor, and a circuit-completing contact-device movable under denominational control of said carriage and acting when moved to directly engage said digit-selecting contact-members seriatim for energizing the selected digit-magnets in denominational order, each digit-selecting contact-member including a formation for enabling said denominationally controlled contact-device to directly make and break contact therewith, irrespective of the digit-selecting positions to which said digit-contact-member has been shifted.

24. In a computing machine having singly-operated digit-types, a letter-feeding carriage, totalizing wheels, and a set of electromagnets for operating said digit-types; a circuit-controlling mechanism for the digit-magnets for enabling the latter to print a total indicated by said wheels, including a series of parallel digit-representing conductors individually connected to said digit-magnets, a denominational series of individually shiftable digit-selecting contact-members, one for each wheel, differentially positionable, under the control of said wheels, to engage the digit-conductors representing the digits registered in said wheels to thereby partially complete circuits for the corresponding digit-magnets, and a set of circuit-completing denominational contact-fingers, one for each shiftable digit-contact-member, said denominational contact-fingers being movable seriatim under control of the carriage to engage their respective shifted digit-contact-members and thereby energize the selected digit-magnets consecutively to actuate the corresponding digit-types for printing said total, each digit-contact-member having a formation to enable its corresponding one of said contact-fingers to directly make and break contact therewith, irrespective of the digit selecting position to which said digit-contact-member has been shifted.

25. In a typing and computing machine having digit-types from "0" to "9", a letter-feeding carriage, a space-key, and denominational totalizing wheels, a total-taking mechanism, including a set of total-reading feelers, spirals on said wheels for adjusting said feelers to positions indicative of the total, electromagnets for operating the digit-types and the space-key, circuits including digit-selecting and denomination-selecting contact-devices controlled by said feelers and carriage, said circuits also including a switch adjustable to enable any feeler at zero position to select either the zero-type magnet or the space-key magnet, said circuits operative to select the proper magnets and energize the same in denominational order to automatically print the total indicated by said feelers, said switch being normally set so that the space-key magnet is selected by the zero-reading feelers of higher denomination than the first significant figure of a total, to thereby automatically step the carriage to the first significant figure denomination, and means co-operative with said carriage and with the feeler which reads said first significant figure to cause said switch to be automatically set to cut in the zero-type magnet and concomitantly cut out the space-key magnet, to make the zero-type magnet potentially effective after the printing of the first significant figure.

26. A machine of the class described having, in combination, digit-types, a letter-feed carriage coacting with said digit-types, denominational totalizer-wheels, indexable denominational drivers for said wheels, a cycling general operator for reciprocating said drivers, and a total-printing mechanism including digit-evaluating spirals, each connected to a companion totalizer-wheel, spiral-reading feelers, a total-key, means responsive to operation of said total-key to cause the feelers to move from normally retracted positions, and thereby assume different total-reading positions against said spirals, means coacting with the differently positioned feelers to concomitantly select the corresponding digit-types, means operating under control of the carriage to actuate the selected digit-types in denominational order by power, and means operated by the general operator, in a timed initial portion of a cycle following the total-printing, to automatically restore said feelers to said normally retracted positions, and concomitantly restore said type-selecting means, before the general operator would advance said totalizer-wheel drivers.

27. In a combined typewriting and computing machine, the combination with a set of digit-types, a carriage co-operative therewith to print a total digit by digit, and a set of denominational computation wheels, of type-selecting mechanism including a set of digit-elements corresponding with said types, a set of digit-valuating spirals connected to said wheels, a set of denominational trains, including spiral-reading feelers, differentially positioned under the control of said spirals, to effect a selection of said digit-elements and thereby select said types, according to the angular positions of said wheels, and type-driving mechanism having means under control of said selected digit-elements and under denominational control of said carriage, to drive the selected digit-type seriatim, and free the same for separate return to normal positions.

28. In a combined typewriting and computing machine having digit-types from "0" to "9", a letter-feeding carriage, a universal letter-feeding device for said carriage, and denominational totalizer wheels; a total-typing mechanism including, in combination, a set of total-reading feelers, spirals, connected to said wheels, for adjusting said feelers to total-reading positions, a set of digit-elements from "0" to "9" corresponding with the digit-types, the "0" digit-element being also co-operative with the letter-feeding device, means co-operative with said feelers to register a selection of said digit-elements relative to all of said wheels, power means co-operative with the selected digit-elements and under denominational control of the carriage for actuating the digit-types or the letter-feeding device, and adjustable means normally conditioned so that the "0" digit-element, under control of the carriage, normally effects actuation of said letter-feeding device, without operating the "0" type, whereby each wheel that presents a non-significant "0" co-operates to advance the carriage step by step from the highest denomination to the first wheel that registers any significant figure.

29. In a combined typewriting and computing machine having digit-types from "0" to "9", a letter-feeding carriage, a universal letter-feeding device for said carriage, and denominational totalizer wheels; a total-typing mechanism including, in combination, a set of total-reading feelers, spirals, connected to said wheels, for adjusting said feelers to total-reading positions, a set of digit-elements from "0" to "9" corresponding with the digit-types, the "0" digit-element being also co-operative with the letter-feeding device, means co-operative with said feelers to register a selection of said digit-elements relative to all of said wheels, power means co-operative with the selected digit-elements and under denominational control of the carriage for actuating the digit-types or the letter-feeding device, adjustable means normally conditioned so that the "0" digit-element, under control of the carriage, normally effects actuation of said letter-feeding device, without operating the "0" type, whereby each wheel that presents a non-significant "0" co-operates to advance the carriage step by step from the highest denomination to the first wheel that registers any significant figure, and means, operated concomitantly with any type from "1" to "9" that prints said first significant figure, to adjust said adjustable means so that the "0" digit-element, under the control of the carriage, effects actuation of the "0" digit-type at any succeeding denomination for which the wheel registers a significant "0".

30. A machine constructed according to claim 29, and having a cycling operator, and means actuated by said cycling operator to restore said adjusted means to normal condition preparatory to printing another total.

ALFRED G. F. KUROWSKI.

CERTIFICATE OF CORRECTION.

Patent No. 2,155,991. April 25, 1939.

ALFRED G. F. KUROWSKI.

It is hereby certified that error appears in the printed specification of the above numbered patent requiring correction as follows: Page 13, second column, line 33, claim 7, for "an" read any; page 14, second column, line 32, claim 15, for "type" read types; line 44, claim 16, after the word "digits" insert a comma; and that the said Letters Patent should be read with this correction therein that the same may conform to the record of the case in the Patent Office.

Signed and sealed this 30th day of May, A. D. 1939.

Henry Van Arsdale (Seal) Acting Commissioner of Patents.